United States Patent

Kuzunuki et al.

[19]

[11] Patent Number: 5,903,667
[45] Date of Patent: May 11, 1999

[54] HANDWRITTEN INPUT INFORMATION PROCESSING APPARATUS AND HANDWRITTEN INPUT INFORMATION SYSTEM USING THE SAME

[75] Inventors: Soshiro Kuzunuki, Katsuta; Yasushi Fukunaga, Hitachi; Hiroshi Shojima, Hitachi; Toshifumi Arai, Hitachi; Masaki Miura, Hitachi; Toshimi Yokota, Hitachi, all of Japan

[73] Assignee: Hitachi, Ltd., Tokyo, Japan

[21] Appl. No.: 08/082,528

[22] Filed: Jun. 25, 1993

Related U.S. Application Data

[63] Continuation of application No. 07/684,931, filed as application No. PCT/JP90/01078, Aug. 24, 1990, abandoned.

[30] Foreign Application Priority Data

Aug. 25, 1989 [JP] Japan .................................. 1-217360

[51] Int. Cl.[6] ............................................. G06K 9/00
[52] U.S. Cl. .......................................... 382/187; 382/189
[58] Field of Search ................................ 382/13, 61, 24, 382/25, 9, 41, 185, 187, 188, 189, 312, 317; 345/179, 157, 156

[56] References Cited

U.S. PATENT DOCUMENTS

| | | | |
|---|---|---|---|
| 4,656,317 | 4/1987 | Tsugei et al. ............................ | 178/18 |
| 4,763,356 | 8/1988 | Day, Jr. .................................. | 379/368 |
| 4,811,416 | 3/1989 | Nakamura ................................ | 382/41 |
| 4,933,979 | 6/1990 | Suzuki et al. ............................ | 382/61 |
| 5,063,600 | 11/1991 | Norwood .................................. | 382/13 |
| 5,134,669 | 7/1992 | Keough et al. ........................... | 382/61 |

FOREIGN PATENT DOCUMENTS

| | | |
|---|---|---|
| A-0 109 581 | 5/1984 | European Pat. Off. . |
| A-61-183730 | 8/1986 | Japan . |
| 2193827 | 2/1988 | United Kingdom . |

OTHER PUBLICATIONS

'Algorithm to Capture Handwriting on a Tablet', IBM Technical Disclosure Bulletin, vol. 28, No. 12, May 1986, pp. 5166–5167.
SIG CH 1, vol. 18, No. 2 (1989) pp. 73–74.
"The Complete Hysper Card Handbook" (1987), pp. 161–172.

*Primary Examiner*—Yon J. Couso
*Attorney, Agent, or Firm*—Kenyon & Kenyon

[57] ABSTRACT

In an information processing apparatus having a handwriting input unit made of an integral structure of a handwriting coordinate input device and a plane display, the screen of the handwriting input unit is constituted by one or more areas, and there are provided a form defining unit for defining in advance a process operation for each area and a stroke interpretation executing unit for executing the process operation defined by the form defining unit when a handwritten stroke is inputted to the area. It becomes therefore possible to input data with a realistic sense of writing data on a paper with a pen without intercepting human thinking processes, while considerably improving man-machine interface.

8 Claims, 42 Drawing Sheets

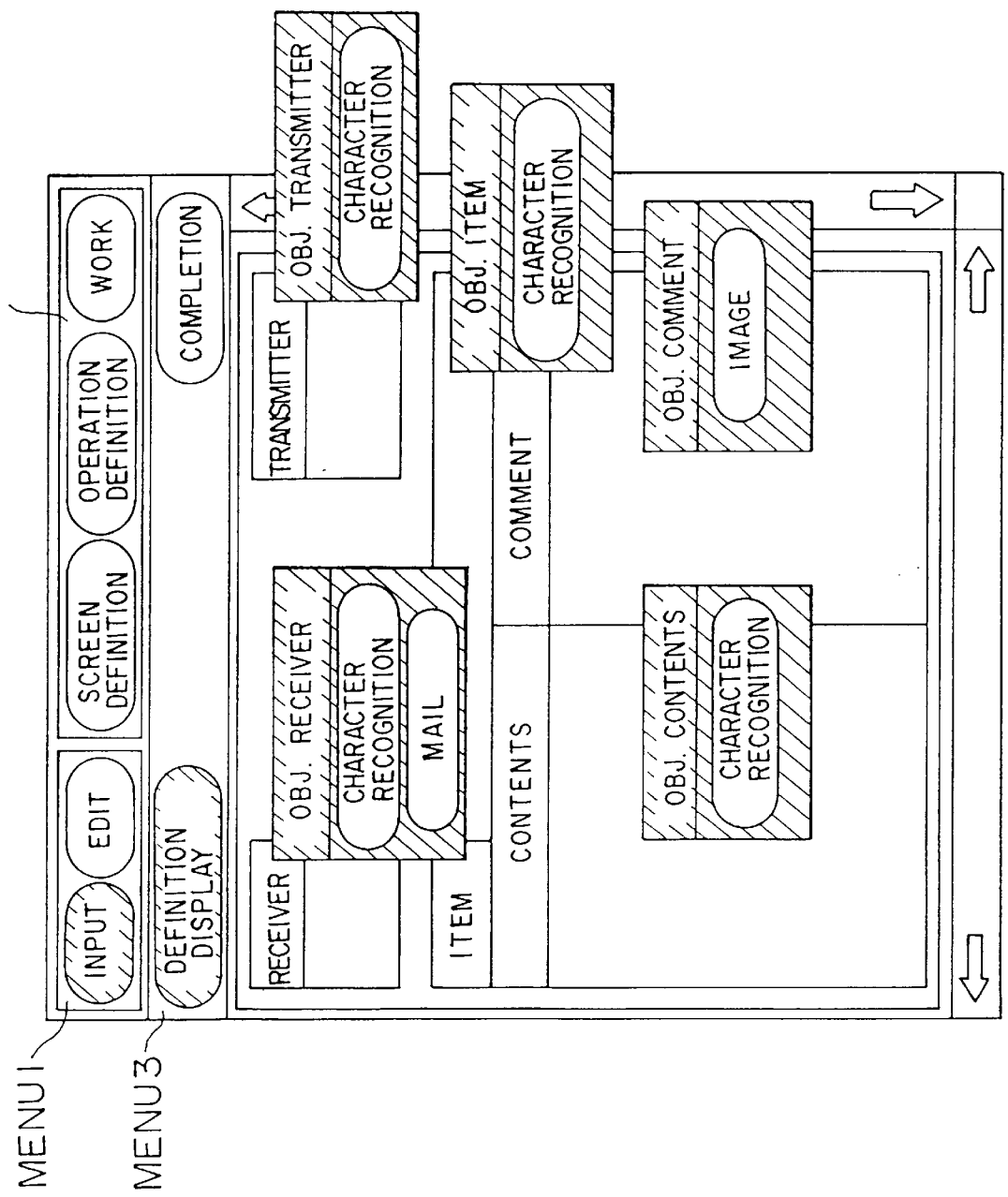

FIG. 19 (a)

```
OBJECT INPUT_MENU (MENU)
{                                               1
  event EDIT_STROKE_OFF ( ) {                   2
  event_map (`INPUT STROKE_ON,                  3
             `INPUT STROKE_OFF)                 4
        STROKE_ERASE ( )                        5
        MENU_HIGHLIGHT                          6
  }                                             7
                                                8
}
```

FIG. 19 (b)

```
OBJECT EDIT_MENU (MENU)
{                                               1
  event INPUT_STROKE_OFF ( ) {                  2
  event_map (`EDIT_STROKE_ON,                   3
             `EDIT_STROKE_OFF)                  4
        STROKE_ERASE ( )                        5
        MENU_HIGHLIGHT ( )                      6
  }                                             7
}                                               8
```

FIG. 20

| OBJECT SHEET (WINDOW) | |
|---|---|
| { | 1 |
|   event INPUT_STROKE_OFF | 2 |
|       STROKE_ERASE | 3 |
|   } | 4 |
|   event EDIT_STROKE_OFF ( ) { | 5 |
|       STROKE_ERASE ( ) | 6 |
|   } | 7 |
|   } | 8 |

FIG. 21

| OBJECT RECEIVER (RECOGNITION) | |
|---|---|
| sttypedef KANJI_1!KANJI_2:KANJI | 1 |
| sttypedef HIRAGANA ! | 2 |
| KATAKANA!KANJI:NAME | 3 |
| attributes=name_result:NAME | 4 |
| attributes=proof_result:PROOF | 5 |
| variables=CUT_OUT ok:boolean | 6 |
| { | 7 |
| event INPUT STROKE ON ( ) { | 8 |
| send STROKE CUT_OUT FRAME (CUT_OUT_OK) | 9 |
| if CUT_OUT_OF {SEND RECOGNITION(name_ | 10 |
| result)}     RECOGNITON EXECUTION | |
| while STROKE_OFF { } | 11 |
| } | 12 |
| event INPUT_STROKE_TIMEOUT ( ) { | 13 |
| send RECOGNITION EXECUTION (name_result) | 14 |
| send TRANSFER RECEIVER_REGISTRATION | 15 |
| (name_result) | |
| send TRANSFER MAIL ( ) | 16 |
| } | 17 |
| event EDIT_STROKE_TIMEOUT ( ) { | 18 |
| | 19 |
| send RECOGNITION_RECOGNITION | |
| EXECUTION(proof_result) | 20 |
| } | 21 |
| } | |

FIG. 2 2

| OBJECT RECOGNITION (WINDOW) | |
|---|---|
| variables=kind:int | 1 |
| { | 2 |
|   message RECOGNITION_EXECUTION(result:STTYPE) { | 3 |
|     send STROKE_TYPE KIND(result, kind) | 4 |
|   if kind=CHARACTER {send RECOGNITION CHARACTER_RECOGNITION_EXECUTION result} | 5 |
|   if kind= GRAPHICS {send RECOGNITION GRAPHICS _RECOGNITION _EXECUTION result} | 6 |
|   if kind= LINE {send RECOGNITION LINE _RECOGNITION  EXECUTION result} | 7 |
|   if kind=IMAGE {send RECOGNITION IMAGE FOMATION EXECUTION result} | 8 |
|   if kind= EDIT_SYMBOL {send RECOGNITION EDIT _SYMBOL FOMATION EXECUTION result} | 9 |
|   if kind= EDIT_SYMBOL {send RECOGNITION EDIT _SYMBOL FOMATION EXECUTION result} | 10 |
|   } | 11 |
|   message CHARACTER _RECOGNITION _RXECUTION (cha_result : CHA _ST) { | 12 |
|     STROKE_ERASE ( ) | 13 |
|     CHARACTER RECOGNITION(cha_result) | 14 |
|     send DISPLAY_CHARACTER(cha_result) | 15 |
|   } send DISPLAY_CHARACTER(cha_result) | 16 |
|   message GRAPHICS_RECOGNITION _EXECUTION (graph_result:GRAPH _ST) { | 17 |
|     STROKE_ERASE ( ) | 18 |
|     GRAPHICS_RECOGNITION(graph_result) | 19 |
|     send DISPLAY_GRAPHICS(graph_result) | 20 |
|   } | 21 |
|   message LINE_RECOGNITION EXECUTION (Line_result:LINE_ST) { | 22 |
|     STROKE_ERASE ( ) | 23 |
|     LINE_RECOGNITION ( ) | 24 |
|     send DISPLAY_LINE(line_result) | 25 |
|   } | 26 |
|   message IMAGE_FOMATION EXECUTION (image_result : IMAGE_ST) { | 27 |
|     STROKE_ERASE ( ) | 28 |
|     send DISPLAY_IMAGE(image_result) | 29 |
|   } | 30 |
|   message EDIT_SYMBOL_RECOGNITION _EXECUTION (proof_result : PROOF_ST) { | 31 |
|     STROKE_ERASE ( ) | 32 |
|     EDIT_SYMBOL_RECOGNITION(proof_result) | 33 |
|     send EDIT_KIND(kind) | 34 |
|     send EDIT_EXECUTION(kind, proof_result) | 35 |
|   } | 36 |
| } | 37 |

FIG. 2 3

| OBJECT DISPLAY (WINDOW) | |
|---|---|
| variables=ok:boolean | 1 |
| { | 2 |
| message CHARACTER (cha_result} CHA_ST) { | 3 |
|   send RANGE_CHECK_RESULTS ARE (cha_result, ok) | 4 |
|   if ok {CHARACTER_DISPLAY} | 5 |
|     else {ALARM_DISPLAY} | 6 |
| } | 7 |
| message MESSAGE_GRAPHICS (graph_result} GRAPH_ST) { | 8 |
|   send CHECK OF RANGE RESULT IS(graph_result, ok) | 9 |
|     if ok {GRAPHICS DISPLAY} | 10 |
|     else {ALARM DISPLAY} | 11 |
| } | 12 |
| message LINE (line_result:LINE_ST) { | 13 |
|   send CHECK OF RANGE RESULT IS (line_result, ok) | 14 |
|     if ok {LINE_DISPLAY} | 15 |
|     else {ALARM_DISPLAY} | 16 |
| } | 17 |
| messageIMAGE (image_result:IMAGE_ST) { | 18 |
|   send CHECK OF RANGE RESULT IS (image_result, ok) | 19 |
|     if ok {IMAGE_DISPLAY} | 20 |
|     else {ALARM_DISPLAY} | 21 |
| } | 22 |
| } | 23 |

FIG. 2 5

| OBJECT RECEIVER (RECOGNITION) | |
|---|---|
| sttypedef KANJI_1!KANJI_2:KANJI | 1 |
| sttypedef HIRAGANA ! | 2 |
| KATAKANA!KANJI:NAME | 3 |
| attributes=name_result:NAME | 4 |
| attributes=proof_result:PROOF | 5 |
| variables=CUT_OUT ok:boolean | 6 |
| { | 7 |
| event INPUT_STROKE_ON ( ) { | 8 |
| send STROKE_CUT_OUT FRAME (CUT_OUT_ok) | 9 |
| if CUT_OUT_OK {send RECOGNITION | 10 |
| RECOGNITION EXECUTION (name_result) { | |
| while STROKE_OFF { } | 11 |
| } | 12 |
| event INPUT_STROKE_TIMEOUT ( ) { | 13 |
| send RECOGNITION_RECOGNITION | 14 |
| EXECUTION (name_result) | |
| send TRANSFER TRANSMITTER_ | 15 |
| REGISTRATION (name_result) | 16 |
| } | |
| event EDIT_STROKE_TIMEOUT ( ) { | 17 |
| send RECOGNITION RECOGNITION _EXECUTION(proof_result) | 18 |
| } | 19 |
| } | 20 |

FIG. 26

| OBJECT ITEM (RECOGNITION) | |
|---|---|
| sttypedef KANJI_1!KANJI_2:KANJI | 1 |
| sttypedef HIRAGANA! | 2 |
| KATAKANA!KANJI:TITLE | 3 |
| attributes=title_result:TITLE | 4 |
| attributes=proof_result:PROOF | 5 |
| variables=CUT_OUT ok:boolean | |
| { | 7 |
| event INPUT_STROKE_ON ( ) { | 8 |
| send STROKE_CUT_OUT FRAME (CUT_OUT_OK) | 9 |
| if CUT_OUT ok {send RECOGNITION RECOGNITION_EXECUTION(title_result) } | 10 |
| while STROKE OFF { } | 11 |
| } | 12 |
| event INPUT_STROKE_TIMEOUT ( ) { | 13 |
| send RECOGNITION RECOGNITION_EXECUTION (title_result) | 14 |
| } | 15 |
| event EDIT_STROKE_TIMEOUT ( ) { | 16 |
| send RECOGNITION RECOGNITION_EXECUTION (proof_result) | 17 |
| } | 18 |
| } | 19 |

FIG. 27

| OBJECT CONTENTS (RECOGNITION) | |
|---|---|
| sttypedef ALPHA_S!ALPHA_L:ALPHA | 1 |
| sttypedef KANJI_1!KANJI_2:KANJI | 2 |
| sttypedef NUMERIC!ALPHA!HIRAGANA! | 3 |
| KATAKANA!KANJI:ALL_CHA | 4 |
| attributes=c_result:ALL_CHA | 5 |
| attributes=p_result:PROOF | 6 |
| variables=CUT_OUT ok :boolean | 7 |
| { | 8 |
| event INPUT_STROKE_ON ( ) { | 9 |
| send STROKE_CUT_OUT FRAME (CUT_OUT_OK) | 10 |
| if CUT_OUT ok {send RECOGNITION RECOGNITION_EXECUTION(c_result) | 11 |
| while STROKE_OFF { } | 12 |
| } | 13 |
| event INPUT_STROKE_TIMEOUT ( ) { | 14 |
| send RECOGNITION RECOGNITION_EXECUTION (c_result) | 15 |
| } | 16 |
| event EDIT_STROKE_TIMEOUT ( ) { | 17 |
| send RECOGNITION RECOGNITION_EXECUTION (p_result) | 18 |
| } | 19 |
| } | 20 |

FIG. 28

| OBJECT COMMENT (RECOGNITION) | |
|---|---|
| attributes=image_result:DOT | 1 |
| attributes=proof_result:PROOF | 2 |
| { | 3 |
| event INPUT_STROKE_ON ( ) { | 4 |
| send RECOGNITION RECOGNITION_EXECUTION (image_result) } | 5 |
| while STROKE_OFF { } | 6 |
| } | 7 |
| event EDIT_STROKE_TIMEOUT ( ) { | 8 |
| send RECOGNITION RECOGNITION_EXECUTION (proof_result) | 9 |
| } | 10 |
| } | 11 |

FIG. 29

```
OBJECT VERTICAL_SCROLL (SCREEN_OPERATION)
{                                                            1
   event INPUT STROKE ON ( ) {                               2
      whileSTROKE_OFF {                                      3
         get_delta_co(delta_x, delta_y)                      4
      send SCREEN_OPERATION VERTICAL_SCROLL                  5
                                          (delta_y)
      }                                                      6
   }                                                         7
   event EDIT_STROKE_ON ( ) {                                8
      while STROKE_OFF {                                     9
         get_delta_co1(delta_x, delta_y)                    10
      send SCREEN_OPERATION VERTICAL_SCROLL                 11
                                   (delta_y)
      }                                                     12
   }                                                        13
}                                                           14
```

FIG. 30

| OBJECT SCREEN_OPERATION (WINDOW) | |
|---|---|
| variables=x, y, delta_x, delta_y:int | 1 |
| { | 2 |
|    message VERTICAL_SCROLL (delta_y) { | 3 |
|       get_scroll_co (x, y) | 4 |
|       scroll_exec (x, y, 0, delta_y) | 5 |
|    } | 6 |
|    message HORIZONTAL_SCROLL (delta_x) { | 7 |
|       get_scroll_co (x, y) | 8 |
|       scroll_exec (x, y, delta_x, 0) | 9 |
|    } | 10 |
|    message TWO_DIMENSIONAL_SCROLL | 11 |
|                   (delta_x, delta_y) { | |
|       get_scroll_co (x, y) | 12 |
|       scroll_exec (x, y, delta_x, delta_y) | 13 |
|    } | 14 |
| } | 15 |

FIG. 31

| OBJECT RECEIVER (RECOGNITION) | |
|---|---|
| sttypedef KANJI_1!KANJI_2:KANJI | 1 |
| sttypedef HIRAGANA! | 2 |
| KATAKANA!KANJI:NAME | 3 |
| attributes=name_result:NAME | 4 |
| attributes=proof_result:PROOF | 5 |
| attributes=c_result:DOT/* | 6 |
| CHANGE ATTRIBUTE OF CONTENTS COLUMN*/ | |
| variables=CUT_OUT_ok:boolean | 7 |
| { | 8 |
| event INPUT STROKE ON ( ) { | 9 |
| send STROKE CUT_OUT FRAME (CUT_OUT_OK) | 10 |
| if CUT_OUT_OF (SEND RECOGNITION (name_result)} | 11 |
| while STROKE_OFF { } | 12 |
| } | 13 |
| event INPUT_STROKE_TIMEOUT ( ) { | 14 |
| send RECOGNITION RECOGNITION_EXECUTION (name result) send TRANSFER RECEIVER_REGISTRATION (name result) | 15 |
| send TRANSFER RECEIVER REGISTRATION (name result) | 16 |
| send TRANSFER MAIL ( ) | 17 |
| } | 18 |
| event EDIT_STROKE_TIMEOUT ( ) { | 19 |
| send RECOGNITION RECOGNITION_ EXECUTION (proof_result) | 20 |
|  | 21 |
| } | 22 |

FIG. 33

| No. | FUNCTION | | DEFINITION DISPLAY |
|---|---|---|---|
| 1 | RECOGNITION | CHARACTER RECOGNITION | ( CHARACTER RECOGNITION ) |
| 2 | | GRAPHICS RECOGNITION | ( GRAPHICS RECOGNITION ) |
| 3 | | LINE RECOGNITION | ( LINE RECOGNITION ) |
| 4 | | IMAGE RECOGNITION | ( IMAGE RECOGNITION ) |
| 5 | | EDIT SYMBOL RECOGNITION | ( EDIT SYMBOL RECOGNITION ) |
| 6 | TELEPHONE | | ( TELEPHONE ) |
| 7 | MAIL TRANSFER MAIL | | ( MAIL TRANSFER MAIL ) |
| 8 | TELE-WRITING | | ( TELE-WRITING ) |
| 9 | FAX | | ( FAX ) |

FIG. 34

| No. | PHYSICAL DEVICE | LOGICAL DEVICE |
|---|---|---|
| 1 | STROKE-ON | INPUT_STROKE_ON |
| 2 | STROKE-OFF | INPUT_STROKE_OFF |
| 3 | STROKE TIMEOUT | INPUT_STROKE_TIMEOUT |
| 4 | PEN BUTTON ON | INPUT_PEN_BUTTON_ON |
| 5 | PEN BUTTON OFF | INPUT_PEN_BUTTON_OFF |

FIG. 35

| No. | KIND | |
|---|---|---|
| 1 | INPUT | INPUT_STROKE_ON |
| 2 | | INPUT_STROKE_OFF |
| 3 | | INPUT_STROKE_TIMEOUT |
| 4 | | INPUT_PEN_BUTTON_ON |
| 5 | | INPUT_PEN_BUTTON_OFF |
| 6 | EDIT | EDIT_STROKE_ON |
| 7 | | EDIT_STROKE_OFF |
| 8 | | EDIT_STROKE_TIMEOUT |
| 9 | | EDIT_PEN_BUTTON_ON |
| 10 | | EDIT_PEN_BUTTON_OFF |

FIG. 36

| No. | CLASSIFICATION | KIND | NMEMONIC | | NOTE |
|---|---|---|---|---|---|
| 1 | CHARACTER STROKE | NUMERAL | NUMERIC | CHA_ST | 0-9 |
| 2 | | UPPER CASE ALPHABET | ALPHA-L | | A-Z |
| 3 | | LOWER CASE ALPHABET | ALPHA-S | | a-z |
| 4 | | GREEK CHARACTER | GREEK | | |
| 5 | | SYMBOL CHARACTER | SYMBOL | | |
| 6 | | HIRAGANA CHARACTER | HIRAGANA | | あ-ん |
| 7 | | KATAKANA CHARACTER | KATAKANA | | ア-ン |
| 8 | | KANJI 1ST STANDARD | KANJI-1 | | |
| 9 | | KANJI 2ND STANDARD | KANJI-2 | | |
| 10 | | USER CHARACTER | USER-CHA | | |
| 11 | GRAPHICS STROKE | TWO-DIMENSIONAL GRAPHICS | GRAPH-2D | GRAPH_ST | |
| 12 | | STRAIGHT LINE | S-LINE | | |
| 13 | | SIGN | SIGN | | |
| 14 | LINE STROKE | UNDER LINE | UNDER | LINE_ST | |
| 15 | | GRID LINE | GRID | | |
| 16 | | SPLINE | SPLINE | | |
| 17 | IMAGE STROKE | DOT | DOT | IMAGE_ST | |
| 18 | | VECTOR | VECTOR | | |
| 19 | EDIT STROKE | EDIT SYMBOL | PROOF | PROOF_ST | |

FIG. 4 1

```
OBJECT_TWO_DIMENSIONAL_SCROLL  (SCREEN_OPERATION)
{                                                           1
    event SCREEN_OPERATION_STROKE_ON ( ) {                  2
        whileSCREEN_OPERATION_STROKE_OFF {                  3
            get_delta_co2(delta_x, delta_y)                 4
            send SCREEN_OPERATION TWO_DIMENSIONAL_          5
                SCROLL (delta_x, delta_y)
        }                                                   6
    }                                                       7
}                                                           8
```

FIG. 4 2

| No. | PHYSICAL DEVICE | LOGICAL DEVICE |
|---|---|---|
| 1 | 2ND STROKE-ON ( ) | SCREEN_OPERATION_STROKE_ON ( ) |
| 2 | 2ND STROKE-OFF ( ) | SCREEN_OPERATION_STROKE_OFF ( ) |
| 3 | 2ND STROKE TIMEOUT ( ) | SCREEN_OPERATION_STROKE_TIMEOUT ( ) |
| 4 | 2ND BUTTON-ON ( ) | SCREEN_OPERATION_BUTTON_ON ( ) |
| 5 | 2ND BUTTON-OFF ( ) | SCREEN_OPERATION_BUTTON_OFF ( ) |

1

HANDWRITTEN INPUT INFORMATION PROCESSING APPARATUS AND HANDWRITTEN INPUT INFORMATION SYSTEM USING THE SAME

This application is a continuation of application Ser. No. 07/684,931, filed on Apr. 24, 1991 now abandoned, which is a 371 of PCT/JP90/01078 filed Aug. 24, 1990.

TECHNICAL FIELD

This invention relates to a handwritten input information processing apparatus capable of realizing a realistic sense of writing data on a paper with a pen, and a handwritten input information processing system using the apparatus, and more particularly to a handwritten input information processing apparatus suitable for making a formatted document.

BACKGROUND ART

A conventional handwritten input information processing apparatus realizing a realistic sense of writing data on a paper with a pen is disclosed, for example, in British Patent Laid-open Publication No. GB2193827A, Germany Patent Laid-open Publication Number DE3511353Al, Japanese Patent Laid-open Publication JP-A-63-184130, and SIG CHI, Volume 18, Number 2, (1989), pp. 73 to 74.

A conventional apparatus of the type that formatted data is entered in a touch screen manner is disclosed in Japanese Patent Laid-open Publication JP-A-63-158623 (U.S. Pat. No. 4,763,356).

The above-described conventional techniques include the feature that data can be entered on a screen directly or in a touch screen manner.

A further conventional apparatus in which an operation description is designated at a particular area (icon, menu) on a CRT screen and the operation description is executed upon a click (switch-on or off) of a mouse, is disclosed in the Complete Hyper Card Handbook, Bantom Books Inc., Goodman. D(1987).

A user interface of a recent workstation, may include a tool kit of X windows as disclosed, for example, Nikkei Computer, April 24 Issue, 1989, pp. 81 to 92. This interface is featured in an.object-oriented environment.

The above-described conventional techniques do not consider the handwriting environment of allowing a realistic sense of writing data on a paper with a pen and also executing data writing while understanding an intent of a user. They therefore have a shortcoming in that they are incapable; of becoming adapted to human thinking processes. This problem will be further detailed with reference to FIGS. 2 to 4.

Consider now that a formatted mail document shown in FIG. 2 is processed with a computer. The formatted mail document G100 shown in FIG. 2 is divided into areas G110 to G210. It is necessary for a computer to understand the contents entered in the receiver input area G130, transmitter input area G150, item input area G170, and contents input area G190, hence it is necessary to recognize a handwritten character stroke. An input to the receiver input area G130 is used as the information to identify a receiver to which this document is mailed. It is not necessary for the computer to process the information entered in the comment input area G210. It is sufficient if the content of the comments written by the receiver of the document is sent back to the transmitter. Therefore, a handwritten input stroke is not transformed into character information but it is used directly as a handwritten image comment.

If a formatted mail document is to be formed by a computer using a conventional method, it is necessary as shown in FIG. 3 to enter a handwritting after designating the areas G220 and G230. For example, it is assumed that data is first handwritten in the transmitter area G150 and the comment area G210, and then this mail document is transferred. In this case, a user operates in the following manner.

(1) designate "character" at the menu area G220 with a pen 2, (2) input a handwritten character in the transmitter input area G150 with the pen 2, (3) designate "image" at the menu area G220 with the pen 2, (4) input a handwritten comment in the comment input area G210 with the pen 2, and (5) check the contents of the screen, and if OK, designates "transfer" at the menu area G230.

As above, a user must consider the menu operations (1), (3), and (5) this thereby posing a problem of adapting to the human thinking processes.

A conventional touch screen type format input apparatus has a hierarchic menu structure. Therefore, it has on one hand an advantage that data can be inputted by sequentially designating menus. However, on the other hand, it presents a problem in that a form is limited to a particular type and data is required to be selected from menus so that it is difficult to deal with a variety of forms.

With an X windows tool kit or a HyperCard, as shown in FIG. 4, data is input through an interactive manner with a CRT screen upon a click of a mouse used as a pointing input device. It is not possible to operate by contacting a pen directly with the screen, or to enter a character or graphics through handwriting. Thus, there is an inability of interacting with the processing apparatus with a realistic sense of writing data on a paper with a pen.

There is another problem associated with the above-described conventional techniques. Namely, a conventional information processing apparatus has a size of a desk top or lap top apparatus so that it is not portable like a note book and cannot be used in all types of environments.

SUMMARY OF THE INVENTION

The present invention provides an information processing apparatus which allows a user to enter data with a realistic sense of writing data on a paper with a pen, while understanding and executing an intent of the user.

The present invention also provides an information processing apparatus of a reduced size such as that of a notebook or sheet size capable of being moved and used anywhere.

In the present invention an information processing apparatus has a handwriting input unit made of an integral structure of a handwriting coordinate input device and a plane display. The unit is provided with a form defining unit for defining in advance the process operation for each area of the screen of the handwriting input unit, and a stroke interpretation executing unit for executing the process operation previously defined by the form defining unit when a handwritten stroke is entered in a given area. Therefore, it is possible to realize a handwriting environment allowing a user to enter data with a realistic sense of writing data on a paper with a pen while understanding and executing an intent of a user.

An operation description and its process environment capable of recognizing a handwritten stroke and converting it into a code of a character, graphics, line, or edit symbol are provided. The screen of the handwriting input unit is divided into a plurality of areas to be recognized and not recognized, and an inputted handwritten stroke is converted into a pre-determined code data or image data in correspondence with the data defining the input area.

This invention also provides that the handwriting coordinate input device, a plane display, and their logic circuits constituting the information processing apparatus are mounted on a glass to form an integral structure thereof, thereby making the apparatus to have a size of a notebook or sheet having the thickness of the glass. Furthermore, a memory card is used as a file, and a battery and a wireless interface are used to make the apparatus motor-less and cord-less. Still further, a handwriting input unit, form defining unit, and stroke interpretation executing unit are configured on the assumption that a network is used.

The characteristic features of this invention will further be detailed.

A handwriting input unit has an integral structure of its input and display sections so that the screen operation also represents an input operation, thereby realizing a realistic sense of writing data on a paper with a pen.

The form defining unit first defines the layout of the screen of the handwriting input unit for example as a bill, mail document or the like. Next, based upon this screen layout, an area is automatically set or changed to generate a plurality of significant areas. Then, an operation description is defined for each area as to what type of process operation is to be executed upon an input of a stroke into that area.

For example, in one area, a handwritten stroke is recognized as a character and it is displayed as a clear character in that area. In another area, the same character is displayed at a predetermined position. Further, in another area, the handwritten stroke is also recognized as an edit symbol to edit a character under the edit symbol. Furthermore, a handwritten stroke may be recognized as an image data of a handwritten comment. The operation description is defined by a dedicated handwriting descriptive language suitable for a handwriting process operation.

When a handwritten stroke is entered for a document defined by the form defining unit, the stroke interpretation executing unit calls a predetermined operation description in the corresponding area, to thereby interpret the handwritten stroke and execute the operation in accordance with the operation description.

In general, the form definition is defined only once unless the contents and layout thereof do not change. Therefore, a user only calls a necessary formatted document and directly enters a handwriting in a necessary position (area). Then, the processing unit interprets the meaning of the area and executes the appropriate operation, thereby realizing an environment which allows to understand an intent of the user and execute the operation.

Next, in the handwritten input information processing apparatus, the input/output device and logic circuits are formed in an integral structure and mounted on glass, and a file is stored in a removable memory card. Further, a battery and a wireless interface are provided to enable an access to a network wherever a user may be located. The apparatus can thus be used freely at offices, during business trips, in trains, or at home.

According to the present invention, in a handwritten input information processing apparatus having a handwriting input unit made of an integral structure of a handwriting coordinate input device and a plane display, the type of a process operation to be carried out for each area of the handwriting input unit is defined in advance. When a handwriting is inputted, this is interpreted and the operation is carried out. Therefore, data can be entered with a realistic sense of writing data on a paper with a pen without interrupting the user's thinking processes, thereby considerably improving man-machine interface.

Further, the logic circuits of the handwritten input information processing apparatus are mounted on the glass of the handwriting input unit to make the apparatus as thin as a notebook or a sheet, and a battery and radio waves are used to make the apparatus cord-less. Therefore, the apparatus can be transported anywhere.

Furthermore, there is provided a mechanism allowing to describe a recognition function to convert a handwritten stroke into a code and a process function to use a network. Therefore, it is possible to configure an electronic secretary system supporting most of office transactions such as making documents, mail, telephones, FAXes, and electronic conferences.

BRIEF DESCRIPTION OF DRAWINGS

FIGS. 12 and 13 are diagrams used for explaining the operation and function of the units shown in FIGS. 10 and 11.

FIGS. 14 to 36 are flow charts, programs, and operation illustrations for the system shown in FIG. 1.

FIGS. 41 to 42 show an example of an operation description of the embodiment shown in FIG. 39, and an input area event map.

DETAILED DESCRIPTION

Figure 1:
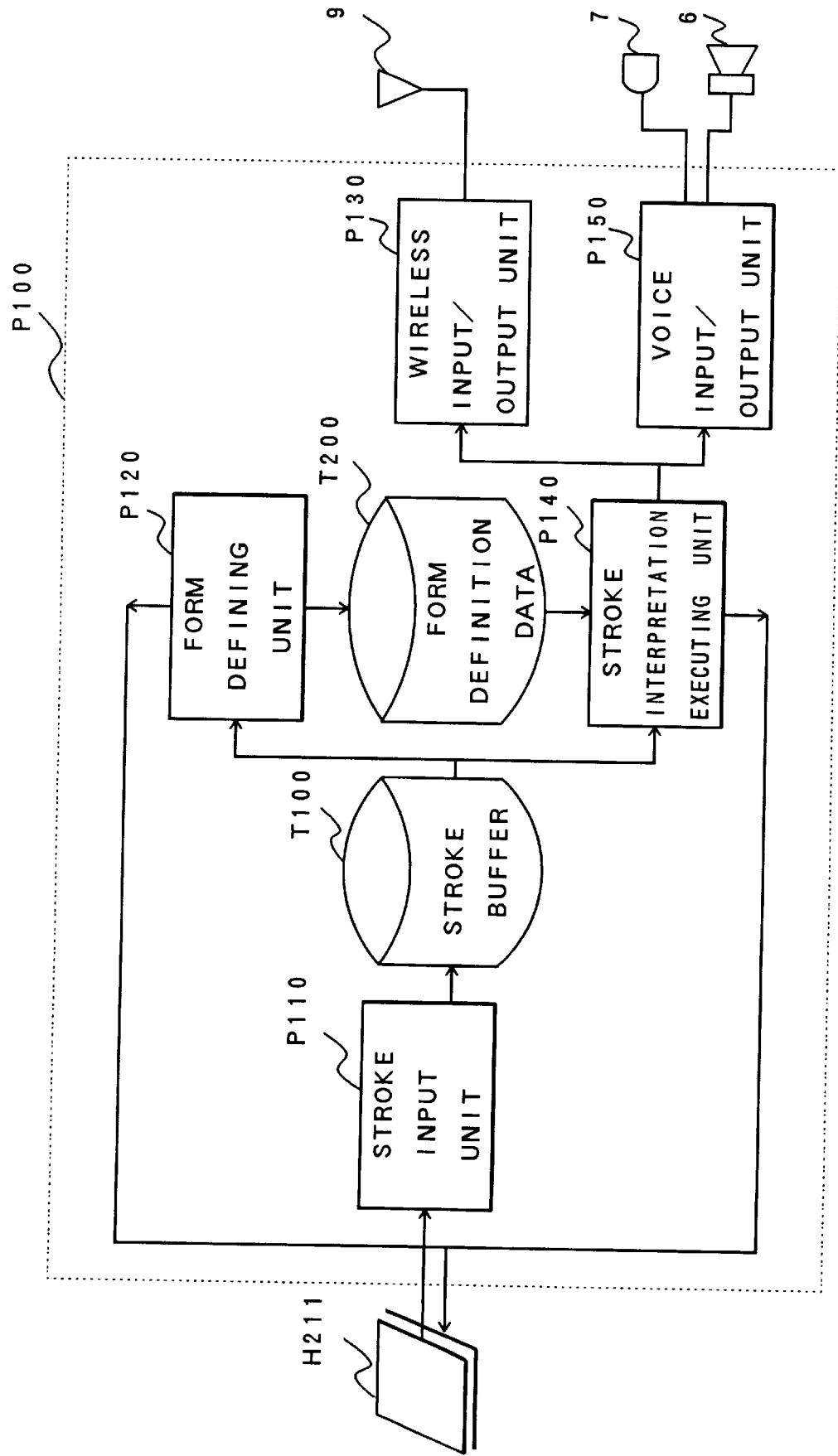
FIG. 1 shows an system arrangement of a handwritten input information processing apparatus according to an embodiment of this invention.

An embodiment of this invention will be described below with reference to FIG. 1, and FIGS. 5 to 36. Reference numerals and symbols used throughout the figures have the following meanings.

(i) 1 to 22: name of device or system
(ii) Hxxx . . . : name of hardware component (xxx is a number)
(iii) Pxxx . . . : name of system structure
(iv) Txxx . . . : name of table structure
(v) Gxxx . . . : name of screen area
(vi) Fxxx . . . : name of program flow chart FIG. 1 shows the system structure of a handwritten input information processing apparatus according to an embodiment of the present invention.

P100 represents a block diagram showing the system structure of this invention, the system being constructed of a processing apparatus such as a microcomputer. H211 represents a handwriting input hardware made of an integral structure of a handwriting coordinate input device and a plane display. P100 represents a stroke input unit for reading a coordinate data at the handwritten input hardware H211. T100 represents a stroke buffer for buffering the data read by the stroke input unit. P120 represents a format defining unit, T200 represents generated format defining data, P140 represents a stroke interpretation executing unit, P130 represents a wireless input/output unit for realizing a cord-less system, 9 represents an antenna, and P150 represents a sound input/output unit connected to a microphone 7 and a speaker 6 for realizing a telephone set.

The outline of the operation of the embodiment of this invention will be described with reference to FIG. 1. Coordinate data from the handwritten input hardware H211 is inputted to the stroke input unit P110 and temporarily stored in the stroke buffer T100. At the same time when the handwritten data is read, the stroke input unit P110 causes the handwritten input hardware H211 to display the handwritten data, thus providing a user with a realistic sense of writing data on a paper with a pen. The coordinate data in the stroke buffer T100 is sequentially read and processed by the format defining unit P120 and the stroke interpretation executing unit P140.

Assuming first that the processing mode of the system is set to a definition mode, the format defining unit is activated. The format defining unit P120 prepares for forming a formatted document using the editor function and cuts out and sets areas for the formatted document. When a handwritten stroke is entered in an area, it is defined what type of processing operation is to be intended by using a dedicated handwriting descriptive language (hereinafter called UI/HAND-TALK). The results of operation definition are filed as a format definition data T200. This format definition data can be accessed and used by the stroke interpretation executing unit P140 as many times as desired unless the format is changed.

As the processing mode of the system is switched from the definition mode to the operation mode, the stroke interpretation executing unit P140 is activated. The coordinate data in the stroke buffer T100 and the format definition data T200 defined for each area are read to analyze and execute a handwriting stroke. The results of the interpretation and execution can be displayed on the handwritten input hardware H211, can be used for information exchange with another processing apparatus via the wireless. input/output unit P130, or can be used for telephone communication via the voice input/output unit P150.

Figure 2:
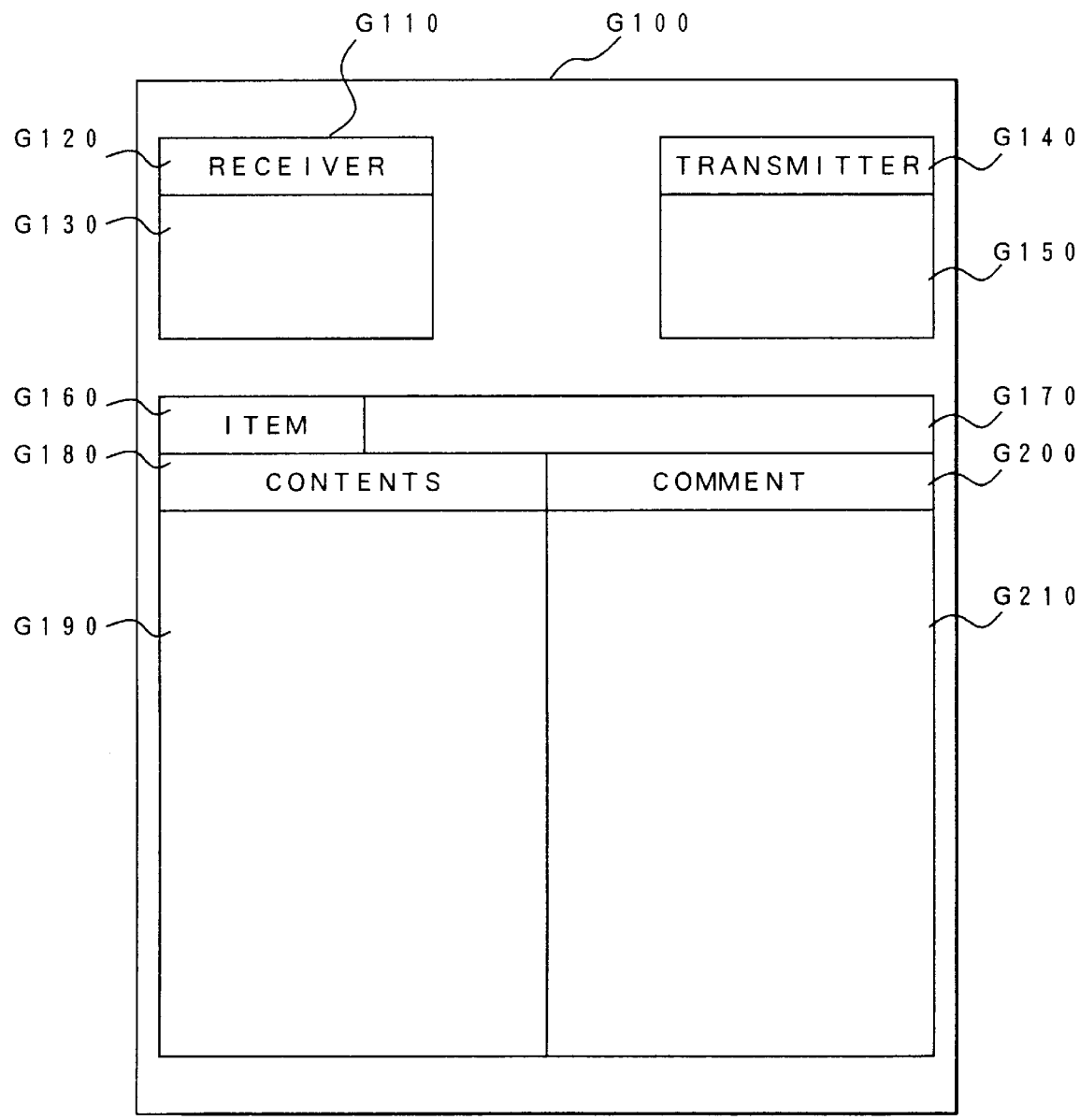
FIG. 2 is a diagram used for explaining the conventional operation of processing a formatted mail document by a computer.
Figure 5:
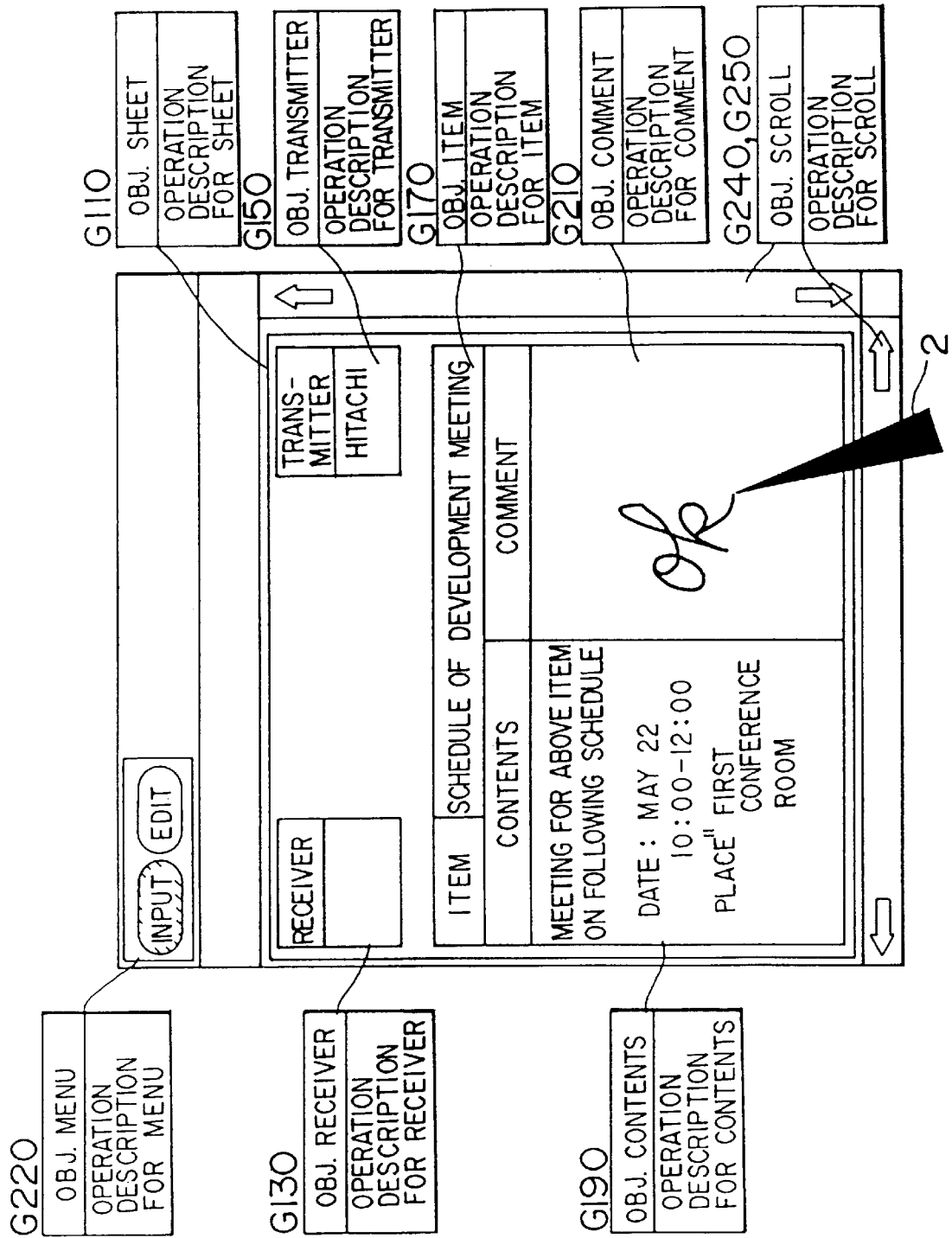
FIG. 5 is a diagram used for explaining the operation of the embodiment of the present this invention shown in FIG. 1.

FIG. 5 shows an example of a screen image of an embodiment of this invention, taking as an example the "mail" formatted document shown in FIG. 2. G110 to G250 represent the contents of operation description which are not usually displayed on the screen. For example, "OBJ. Menu" at G220 indicates the name of program of operation description. The contents of each program operation description will be later detailed. In summary, when a handwriting stroke is entered in an area, the handwriting stroke is processed in accordance with the programmed description for that area. For example, in the item area at G170 and the contents area at G190, handwritten characters are recognized and clean characters thereof are displayed. In the comment area at G210, a memo handwritten with a pen 2 is entered and the handwriting itself is displayed.

As described above, according to the embodiment of this invention, data can be directly entered in an area with a realistic sense of writing data on a paper with a pen.

The details of the embodiment of this invention will be described in the order of the following articles.

Figure 6:
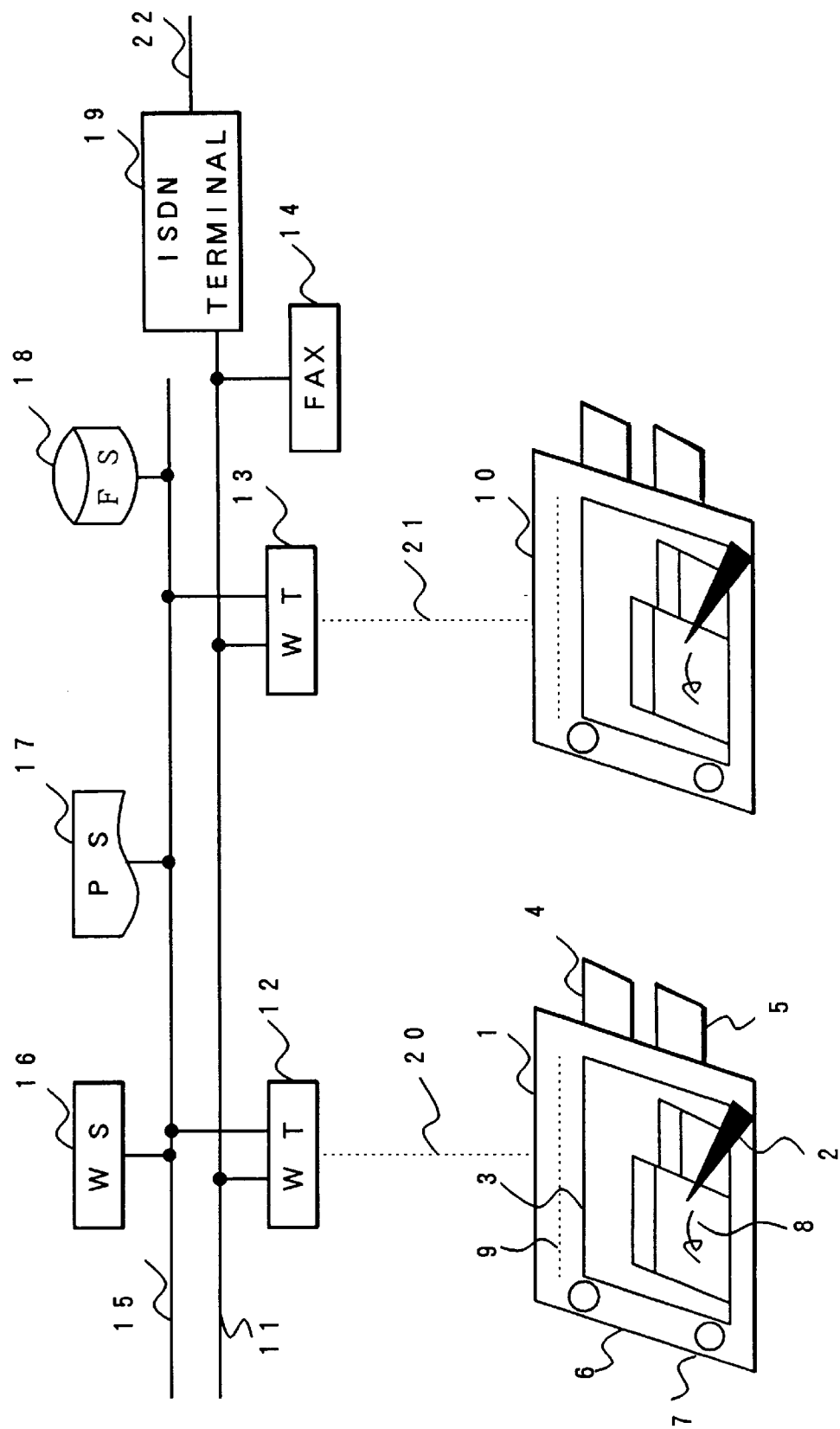
FIG. 6 shows the structure of a system using the handwritten input information processing apparatus shown in FIG. 1.
Figure 7:
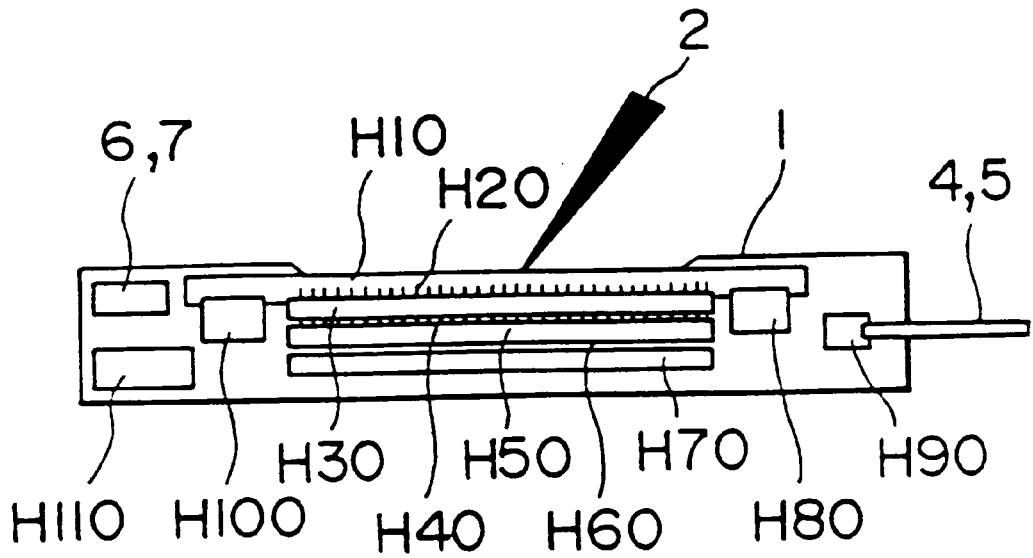
FIG. 7 is a cross section showing a hardware arrangement of the handwritten input information processing apparatus shown in FIG. 1.
Figure 7:
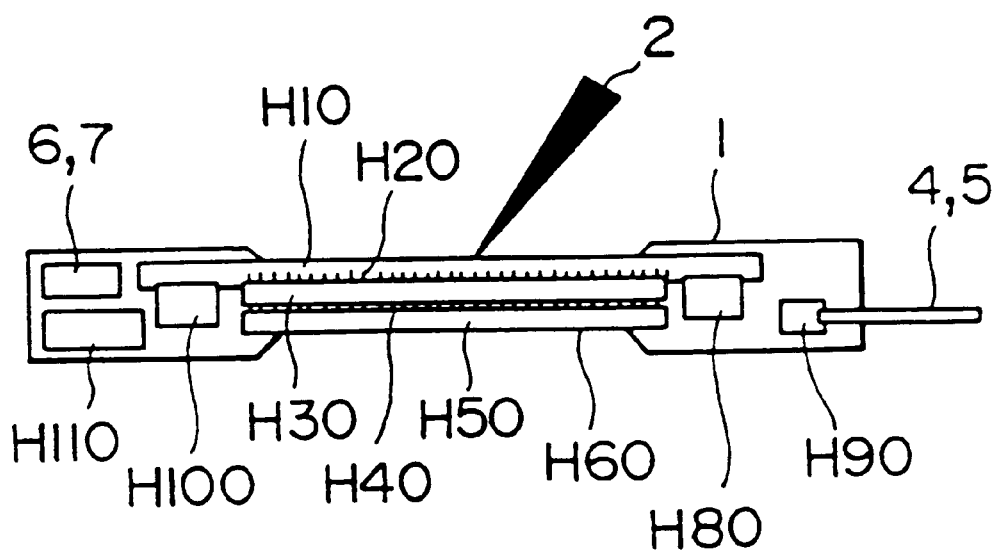
Figure 8:
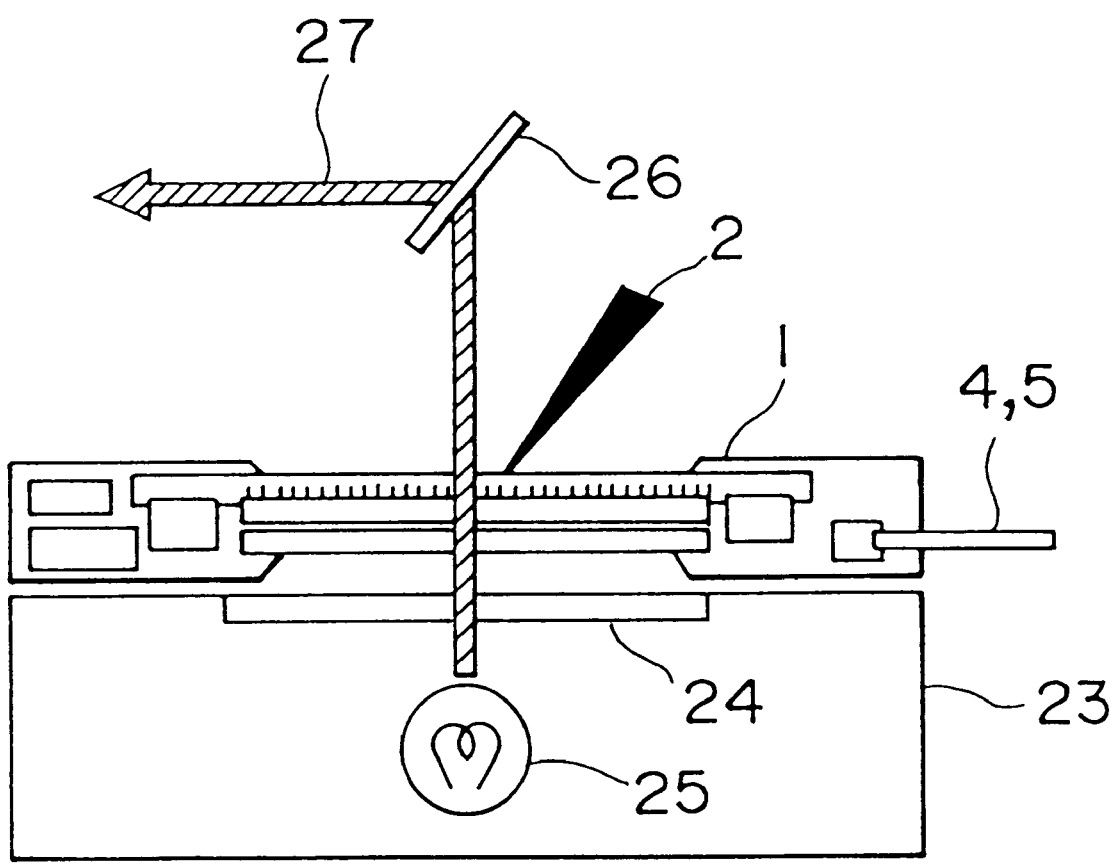
FIG. 8 is a cross section showing a hardware arrangement of the handwritten input information processing apparatus of FIG. 1 when it is configured for the purpose of presentation.
Figure 9:
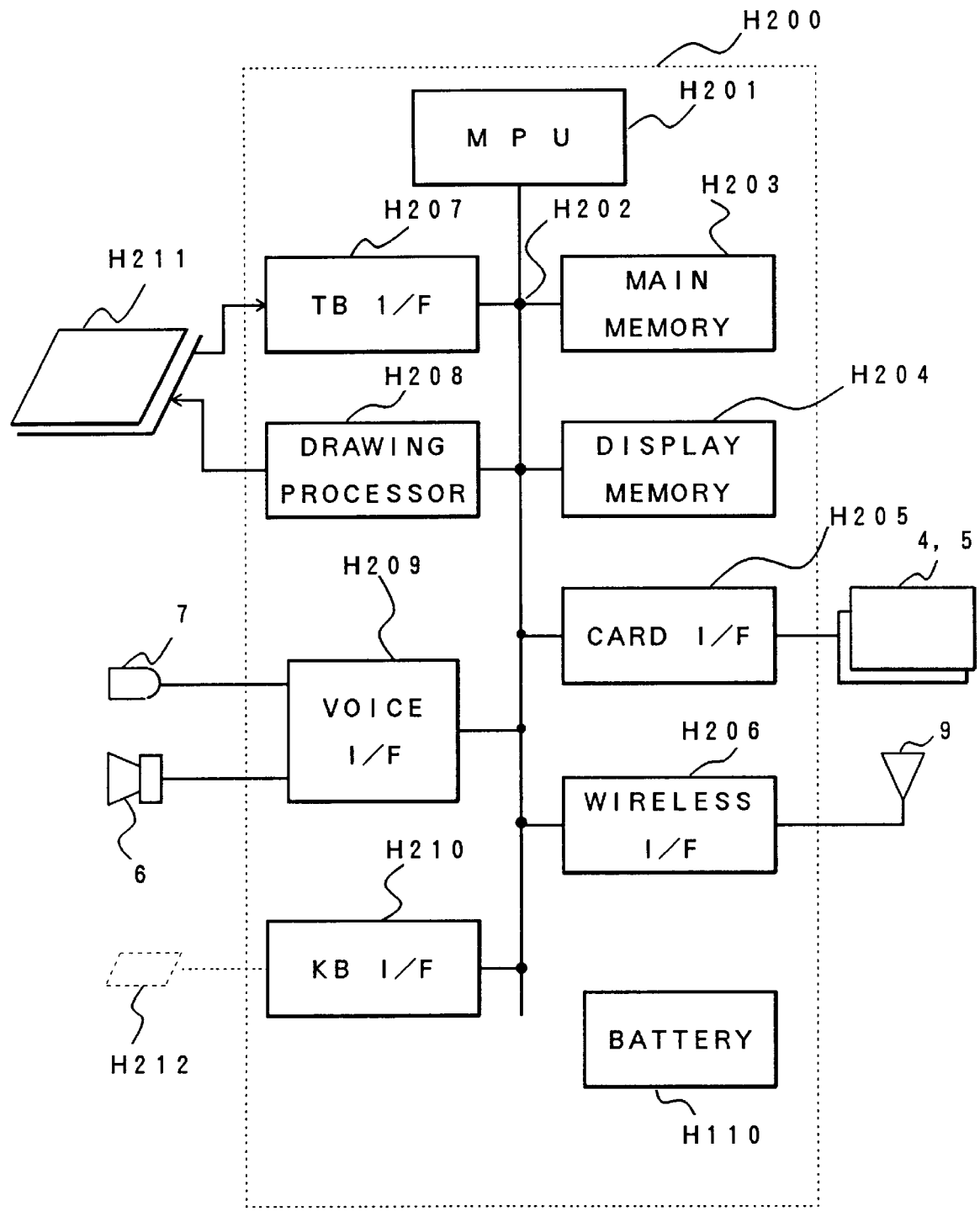
FIG. 9 is a diagram in block form showing logic circuits of the handwritten input information processing apparatus shown in FIG. 1.

(1) Overall system arrangement using the handwritten input information processing apparatus (FIG. 6);
(2) Hardware structure of the handwritten input information processing apparatus (FIGS. 7 to 9);
(3) Description of the detailed system arrangement and operation of the handwritten input information processing apparatus (FIGS. 10 to 13);
(4) Description of detailed programs and their operation (FIGS. 14 to 36)

(1) Overall system arrangement using the handwritten input information processing apparatus FIG. 6 shows the overall system arrangement. Reference numerals 1 and 10 represent handwritten input information processing apparatuses, reference numeral 2 represents a pen, reference numeral 3 represents a screen of the handwritten input hardware H211 made of an integral combination of a handwriting coordinate input apparatus and a plane display, reference numerals 4 and 5 represent memory cards, reference numeral 6 represents a speaker, reference numeral 7 represent a microphone, reference numeral 8 represents a handwritten data written with a pen, and reference numeral 9 represents an antenna built in the handwritten input information processing apparatus 1 for communication with a wireless terminal (WT) 12 using radio waves 20. Reference numerals 11 and 15 represent networks, reference numeral 11 represents a network connected to an ISDN (Integrated Services Digital Network) terminal 19, reference numeral 15 represents a LAN (Local Area Network) such as an Ethernet and a Token Ring connected to a workstation (WS) 16, a print server (PS) 17, and a file server (FS) 18.

The wireless terminals (WTs) 12 and 13 are connected to both the networks 11 and 15 which are accessible by the handwritten input information processing apparatuses 1 and 10. A facsimile device (FAX) 14 is connected to the ISDN network.

In the system arrangement described above, the handwritten input information processing apparatus 1 can operate by itself, or data may be shared with or distributed and processed by another information processing apparatus.

The apparatuses 1 and 10 can be connected via radio waves with the wireless terminals (WTs) 12 and 13, thereby improving their operability. Further, since they can be connected to FAX 14, it is possible to send data inputted from the handwritten input information processing apparatus 1 on-line to another FAX via the ISDN network 22, or to have a mail exchange or an electronic conference between handwritten input information processing apparatuses via networks. It is possible to have an on-line electronic conference using voice and handwritten data, which is particularly useful for remote communication partners.

(2) Hardware structure of the handwritten input information processing apparatus FIG. 7 shows cross sections of hardware of handwritten input information processing apparatuses, wherein FIG. 7(a) is a cross section of an ordinary type handwritten input information processing apparatus, and FIG. 7(b) is a cross section of a presentation type handwritten input information processing apparatus.

Referring to FIG. 7(a), H10 represents a coordinate input glass on which a transparent electrode H20 for X-axis coordinate detection is coated. A transparent electrode H60 for Y-axis coordinate detection is coated on the bottom surface of a glass H50 which is also used for a liquid crystal display (LCD). Glasses for liquid crystal display are therefore glasses H30 and H50 between which liquid crystal H40 is provided. H80 and H100 represent logic circuits for processing a coordinate input and other operation for.the processing apparatus 1, the logic circuits being implemented on the bottom surface of the coordinate input glass H10.

This implementation is realized using the COG (Chip On Glass) technique whereby a bare chip is directly bonded on the glass at the position where there is no coordinate detection and display segment. This technique is applied to mounting a driver IC for a liquid crystal display. Since an LSI bare chip is directly bonded on a glass, it is possible to realize a smaller and thinner device than using the surface mounting technique mainly used at present.

In the embodiment of this invention, the logic circuits H80 and H100 are bonded on the coordinate input glass H10. They may be bonded on the liquid crystal display glass H30 or H50.

H70 represents an EL (ElectroLuminescence) for back light. H90 represents connectors of the memory cards 4 and 5, and H110 represents a battery of the processing apparatus 1. Reference numerals 6 and 7 represent a speaker and a microphone, respectively of a very thin type, which are used as a hand-free telephone set.

As described above, the characteristic features of the processing apparatus reside in that the coordinate input device, display device, and logic devices are made of an integral structure, and that the processing apparatus is made thin.

FIG. 7(b) shows a transparent type processing apparatus wherein a part of the bottom of the housing of this processing apparatus is cut off and the back light EL H70 is removed. As shown in FIG. 8, light 27 from a light source lamp 25 of an OHP (Over Head Projector) indicated at 23 to 27 passes via a lens 24 through the processing apparatus so that an image on the processing apparatus is displayed via a mirror 26 on a screen. This processing apparatus is a so-called LCDOHP which is manufactured nowadays as a display device for a personal computer.

The processing apparatus of this embodiment is suitable for presentation purposes because it can be used as an LCDOHP and data can be handwritten with a pen 2 with a realistic sense of writing data on a transparent sheet with a felt pen. If a color LCD is used, a more effective presentation is possible.

Although FIGS. 7(a) and 7(b) show discrete processing apparatuses, they may be constructed as a single processing apparatus having a structure selectable between FIGS. 7(a) and 7(b).

FIG. 9 shows the hardware structure in block form of the logic circuits constituting the handwritten input information processing apparatus. H200 represents the overall structure in block form. H201 represents a microprocessor MPU, H202 represents the bus line of MPU, H203 represents a main memory, H204 represents an LCD display memory, H205 represents a card interface (I/F) for the memory cards 4 and 5, H206 represents a wireless I/F, H207 represents a coordinate input (TB) TB I/F, H208 represents a drawing processor for developing an image on the display memory H204 and displaying it on LCD, H209 represents a voice I/F for interface with the speaker 6 and the microphone 7, and H210 represents a KB I/F for an optional keyboard (KB) H212. The keyboard H212 is not required in an ordinary case, but it is connected to the processing apparatus when it becomes necessary for data input and program development. The antenna 9 is built in the housing 1 of the processing apparatus as described with FIG. 6. As particularly shown in FIG. 6, the antenna 9 is disposed at the upper area of the processing apparatus so as not to be influenced by a hand holding the pen 2 during handwriting or by other reasons.

Almost all of the logic circuits described above can be made of LSIs and ICs so that they can be bonded on a glass as described previously. Components which cannot be bonded are first mounted on another substrate which is then wired to the logic circuits.

Figure 10:
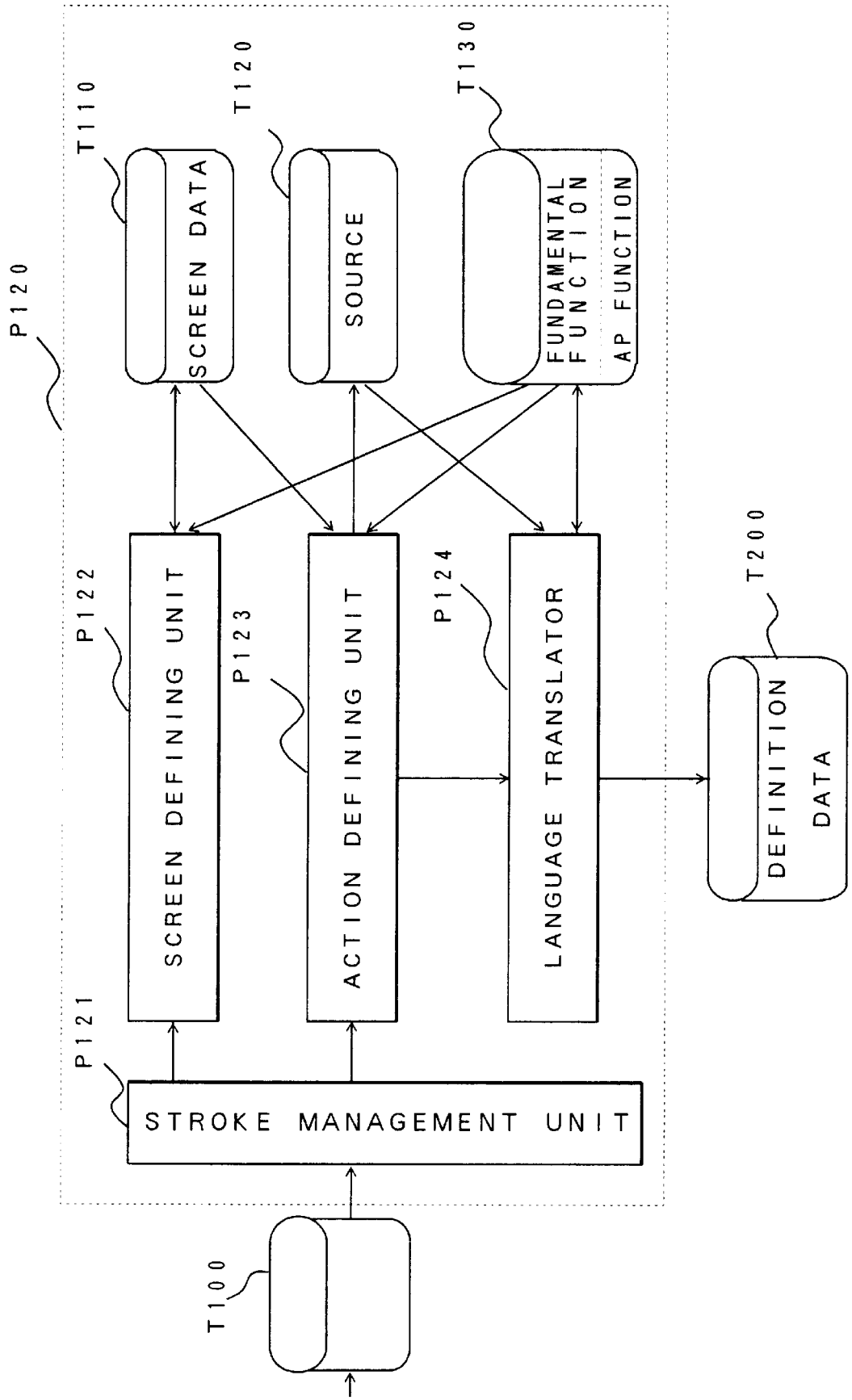
FIG. 10 shows an arrangement of the form defining unit shown in FIG. 1.
Figure 11:
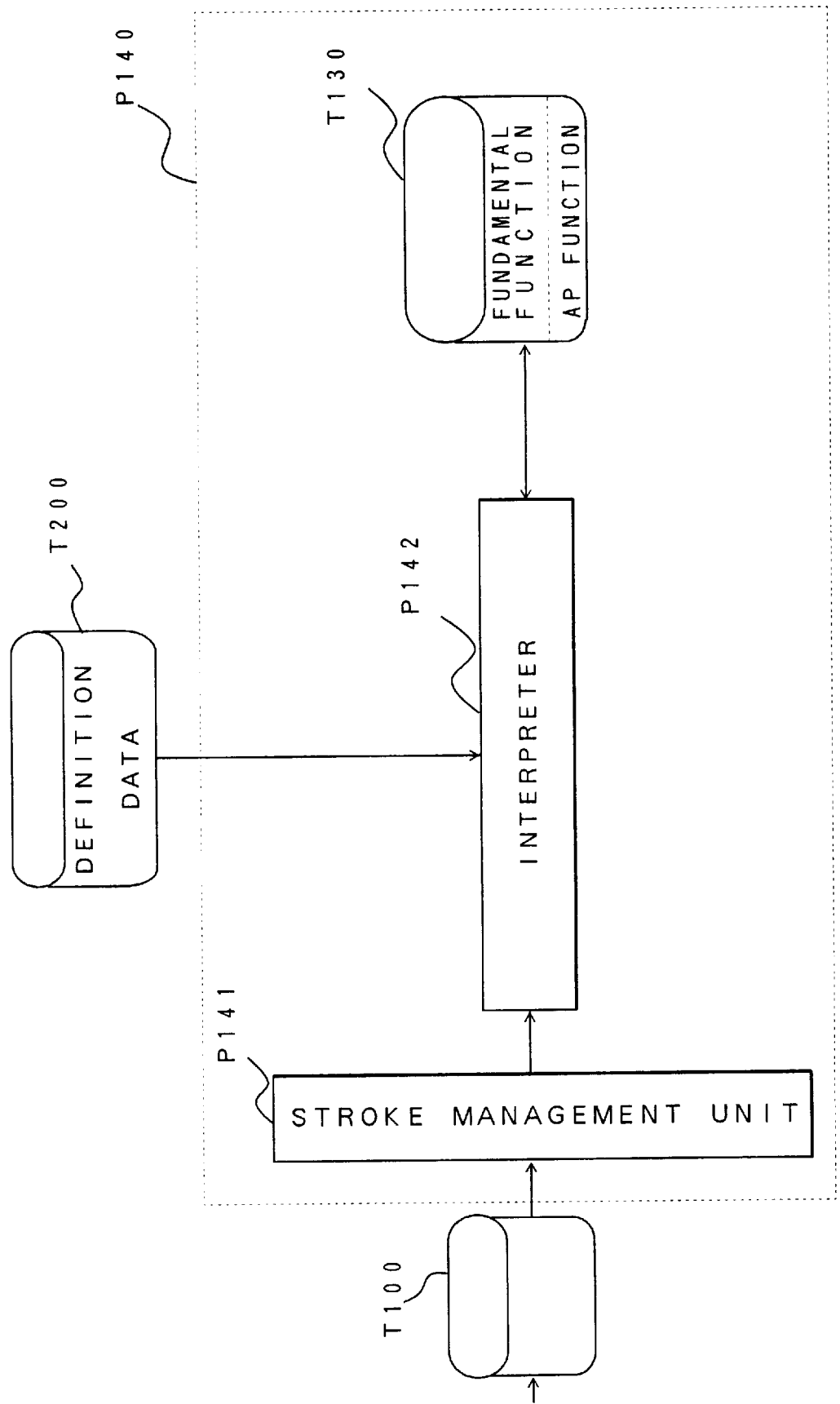
FIG. 11 shows an arrangement of the stroke interpretation executing unit shown in FIG. 1.

(3) Description of the detailed system arrangement and operation of the handwritten input information Processing Apparatus FIG. 10 shows the detailed system arrangement of the format defining unit 120 of the system shown in FIG. 1, and FIG. 11 is the detailed system arrangement of the stroke interpretation executing unit P140.

Referring now to FIG. 10, P121 represents a stroke management unit, P122 represents a screen defining unit, P123 represents an operation defining unit, and P124 represents a UI/HAND-TALK language translator for translating source data T120 of the dedicated handwriting descriptive language UI/HAND-TALK. T110 represents a screen data processed by the screen defining unit P122, and T130 represents a module file of programs used by P122, P123, and P124, including a UI/HAND-TALK fundamental function, other application (AP) functions.

Referring to FIG. 11, P141 represents a stroke management unit similar to P121. P142 represents a UI/HAND-TALK interpreter for reading the UI/HAND-TALK definition data T200 and interpreting and executing it.

As shown in FIGS. 10 and 11, the embodiment of this invention relies on the assumption that there is used the dedicated handwriting descriptive language (UI/HAND-TALK). As will be described later, this language is a dedicated handwriting interpreter using the concept of object-oriented programming recently highlighted as a man-machine interface, which is characterized particularly in management and recognition of handwritten strokes.

The operation and function of the system arrangement shown in FIGS. 10 and 11 will be described with reference to FIG. 12. The form defining unit P120 shown in FIG. 10 will first be described. The form defining unit P120 is broadly divided into a screen definition and an operation definition the programs of which are selectively activated in accordance with the mode in a menu area MENU 2 shown in FIGS. 12(a) and 12(b).

FIG. 12(a) shows a screen of the screen defining mode. On this screen a submenu MENU 3 is displayed for defining the formatted document screen G100. For example, if a "character input" is designated with the pen 2, a character input sheet G320 is displayed. When a handwritten input stroke is entered in a rectangular input area of the sheet, the stroke is recognized as a character so that characters can be sequentially displayed at cursor positions on the sheet G100 as clear characters. This operation may be carried out by connecting an optional keyboard (KB) and using a kana-kanji conversion software.

Similarly, if a "drawing" at the MENU 3 is designated, a drawing sheet is displayed for drawing.

A "template" menu is used for improving the efficiency of screen definition by calling and pasting such a screen as a transmitter and a receiver, which screen is often used and stored along with its operation description.

Upon completion of screen definition, a "completion" at the menu MENU 3 is designated to terminate this process.

As described above, the screen defining unit 120 has the same function as a so-called screen editor.

The operation defining unit P123 shown in FIG. 10 is activated by the stroke management unit P121 when an "operation definition" at the menu MENU 2 is designated as shown in FIG. 12(b). When an area for the operation definition is designated, an operation description sheet G410 is displayed as shown in FIG. 12(b). The operation at the associated area is then described on this sheet. For example, for the item area of the screen G100, the operation description for entering a character is defined by using a "character input" or a "descriptive language" at the menu MENU 3.

For example, it is defined that "when an event of an input stroke is detected, the stroke is cut out as a character and is character-recognized" (the contents of definition at for G410). For a description frequently used, it is possible to easily define it by merely calling a descriptive language sheet G420 and designating a corresponding menu. Instead of using the descriptive language sheet, there may be provided a description command for calling a file having the contents previously defined.

The descriptive data defined in the above manner is stored in the UI/HAND-TALK source file T120 shown in FIG. 10. When the "completion" at the menu MENU 3 shown in FIG. 12(b) is designated, the UI/HAND-TALK language translator P124 shown in FIG. 10 is activated to generate the UI/HAND-TALK definition data (intermediate data) T200 while referring to the files T120 and T130.

It is assumed here that each area of the screen G100 to be defined is automatically derived while referring to the screen data T110 when the screen defining unit P122 detects the "completion" at the menu MENU 3 shown in FIG. 12(a). If areas are to be edited, including re-setting an area and grouping areas (combining two or more areas as a single area), an "larea" at the menu MENU 3 shown in FIG. 12(b) is designated.

If an "operation" at the menu MENU 2 is designated as shown in FIG. 12(c) after the screen definition and the operation definition have been completed, it becomes possible to enter an actual formatted document. On the screen G500 shown in FIG. 12(c), there is shown a handwritten stroke directly entered on the item area G170.

When a handwritten stroke is entered to the item input area G170, the stroke management unit P141 shown in FIG. 11 causes an "Object Item" defined at G410 in FIG. 12(b) to be activated. Since this program has the operation definition to recognize a handwritten input stroke as a character as described previously, handwritten strokes are sequentially recognized as characters and displayed as shown in FIG. 12(c).

This process is carried out by the UI/HAND-TALK interpreter shown in FIG. 11 while referring to the files T200 and T130.

There may occur the case where it is desired to know the outline of operation descriptions assigned to a formatted document, during the "operation" mode. In this case, as shown in FIG. 13, if a "definition display" at the menu MENU 3 is designated with a pen, the operation description contents defined for respective areas are displayed briefly in the form of icons (pictorial symbols). For example, in the receiver area, it is displayed that "character recognition" and a "mail" have been defined. This means that a handwritten stroke is first recognized as a character, and a document is mailed to the destination identified by the recognized character or characters.

With this brief display, it is possible to indicate what type of definition has been assigned to each area.

It is a convenient function to be used particularly when a new format is applied or a user forgets the definition contents for each area.

If more detailed information is desired, e.g., if it is desired to know what font type the character recognition function is directed to, it may be arranged such that the pictorial symbol for the "character recognition" is designated to display the contents thereof. If the operation contents are to be changed or added, the control should resume the above described definition mode.

The types of definition displays are illustrated in FIG. 33. For providing the types of definition displays other than those shown in FIG. 13, the recognition function includes a "graphics recognition" for the recognition of a circle, rectangle, and the like, a "line recognition" for the recognition of an under line and the like, and an "edit symbol recognition" for the recognition of a red character edited with a red pen. Furthermore, as a function using the network shown in FIG. 6, there are a "telephone" function, a "telewriting" function for use with electronic conference, and a "FAX" function.

(4) Description of detailed programs and their operation

Lastly, the detailed programs for the system arrangement described above will be described with reference to the flow charts shown in FIGS. 14 to 36 and in connection with operation description examples described with the dedicated handwriting descriptive language (UI/HAND-TALK).

FIG. 14 shows a main program of the processing apparatus. First, initialization is executed at step F100. In this process, the tables, UI/HAND-TALK interpreter, and screen are initialized.

Figure 12:
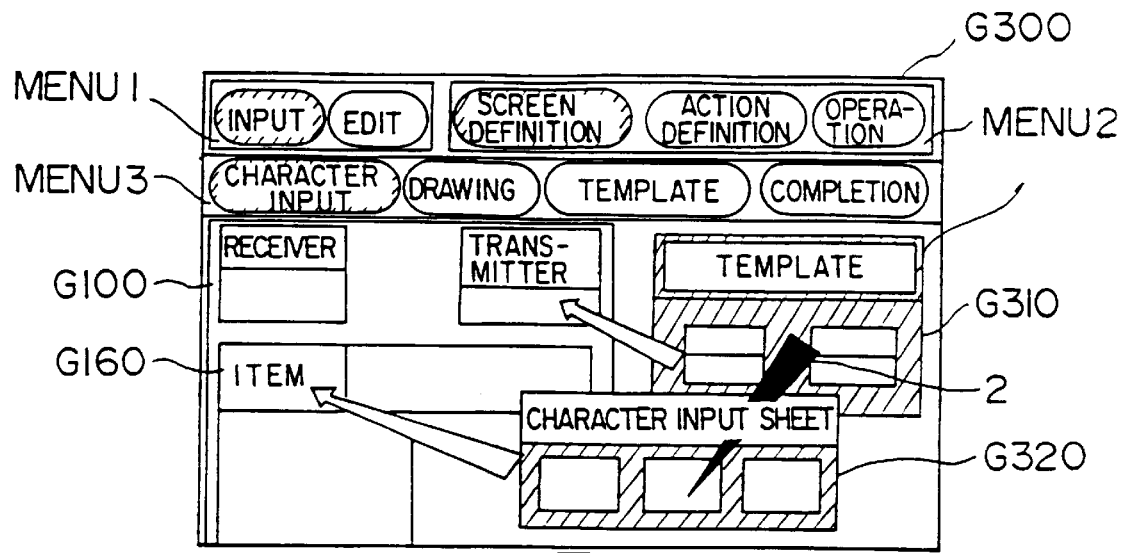
Figure 12:
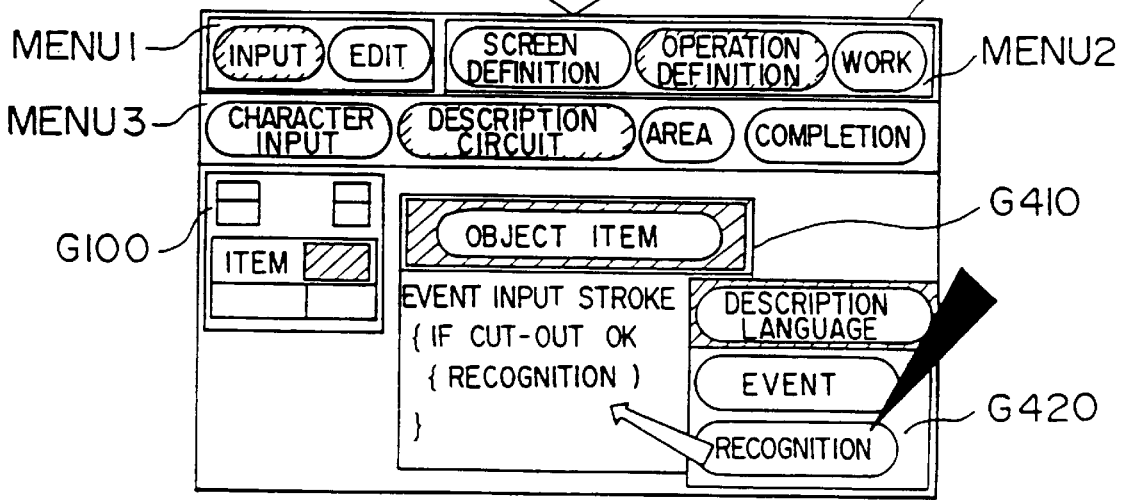
Figure 12:
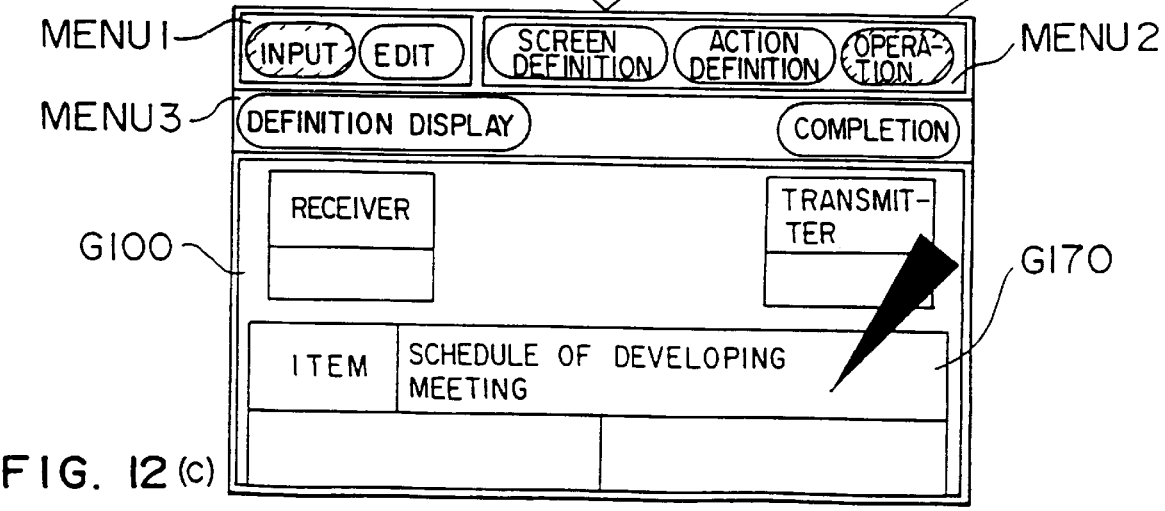
Figure 1:
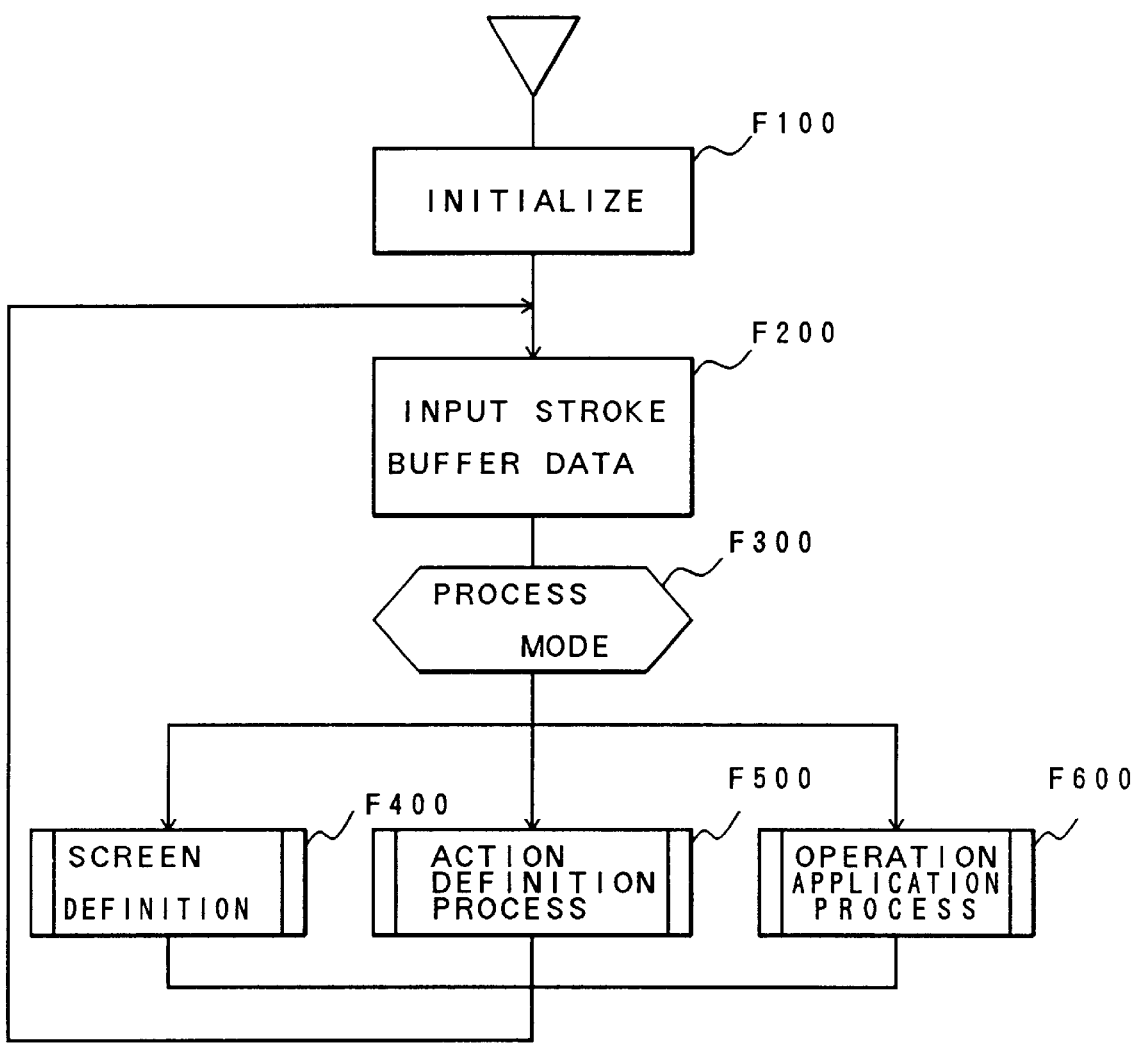

Next, a data input process for the stroke buffer T100 is executed (step F200) to discriminate (step F300) between process modes of the menu MENU 2 described with FIG. 12. In accordance with this descrimination, there is activated one of a screen definition process (step F400), an operation definition process (step F500), and an operating process (step F600).

A particular flow chart for each process will be described.

Figure 15:
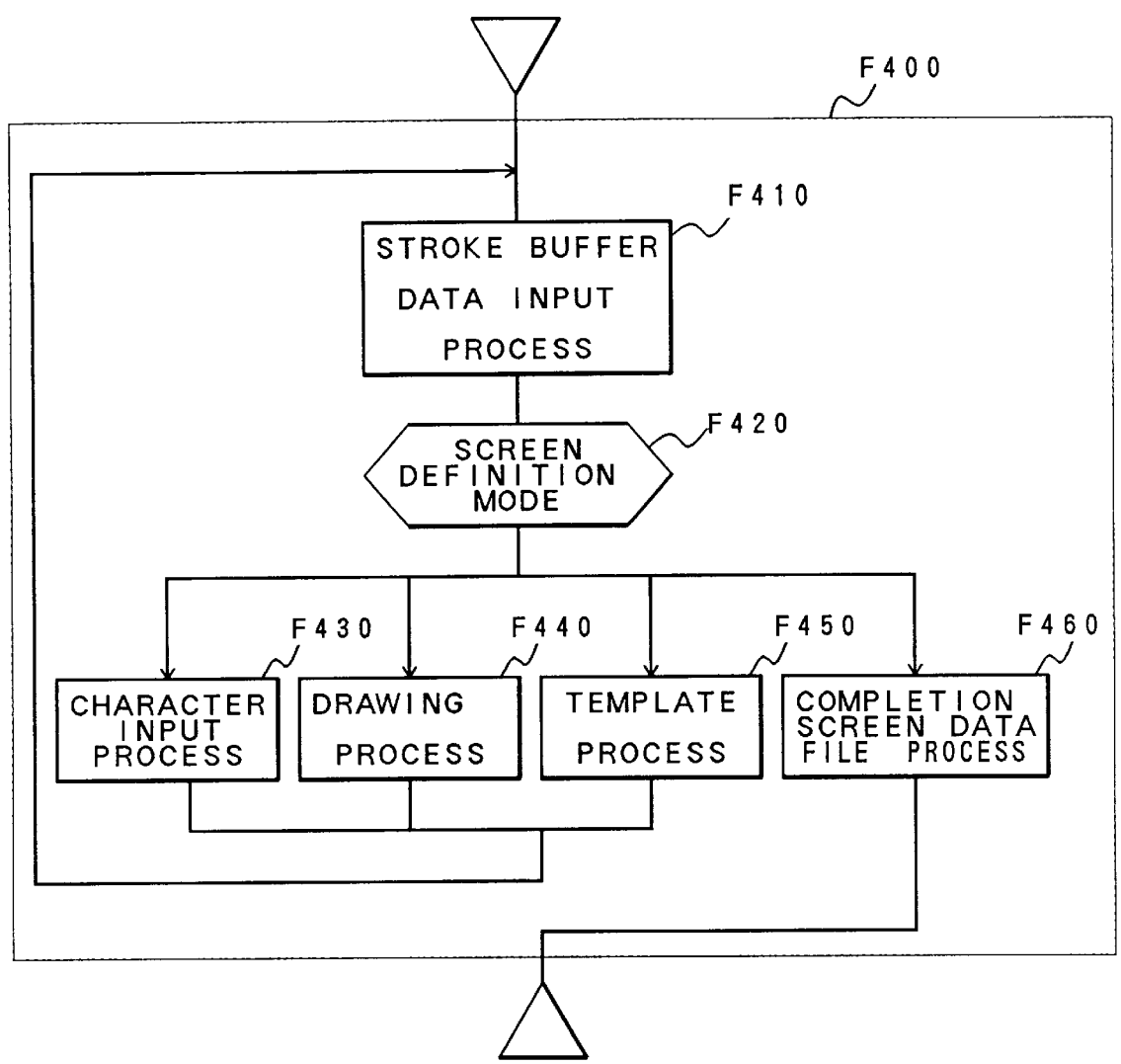

FIG. 15 is the detailed flow chart of the screen definition process (step F400). In this process, a suitable process is activated in accordance with the submenu MENU 3 (FIG. 12(a)).

First, data is fetched from the stroke buffer (step F410) to discriminate the mode of the submenu (step F420) and activate one of a character input process (step F430), a drawing process (step F440), and a template process (step F450). If the "completion" is discriminated at the discrimination step (step F420) at the screen definition mode, this screen definition process is terminated after filing screen data (step F460).

Figure 16:
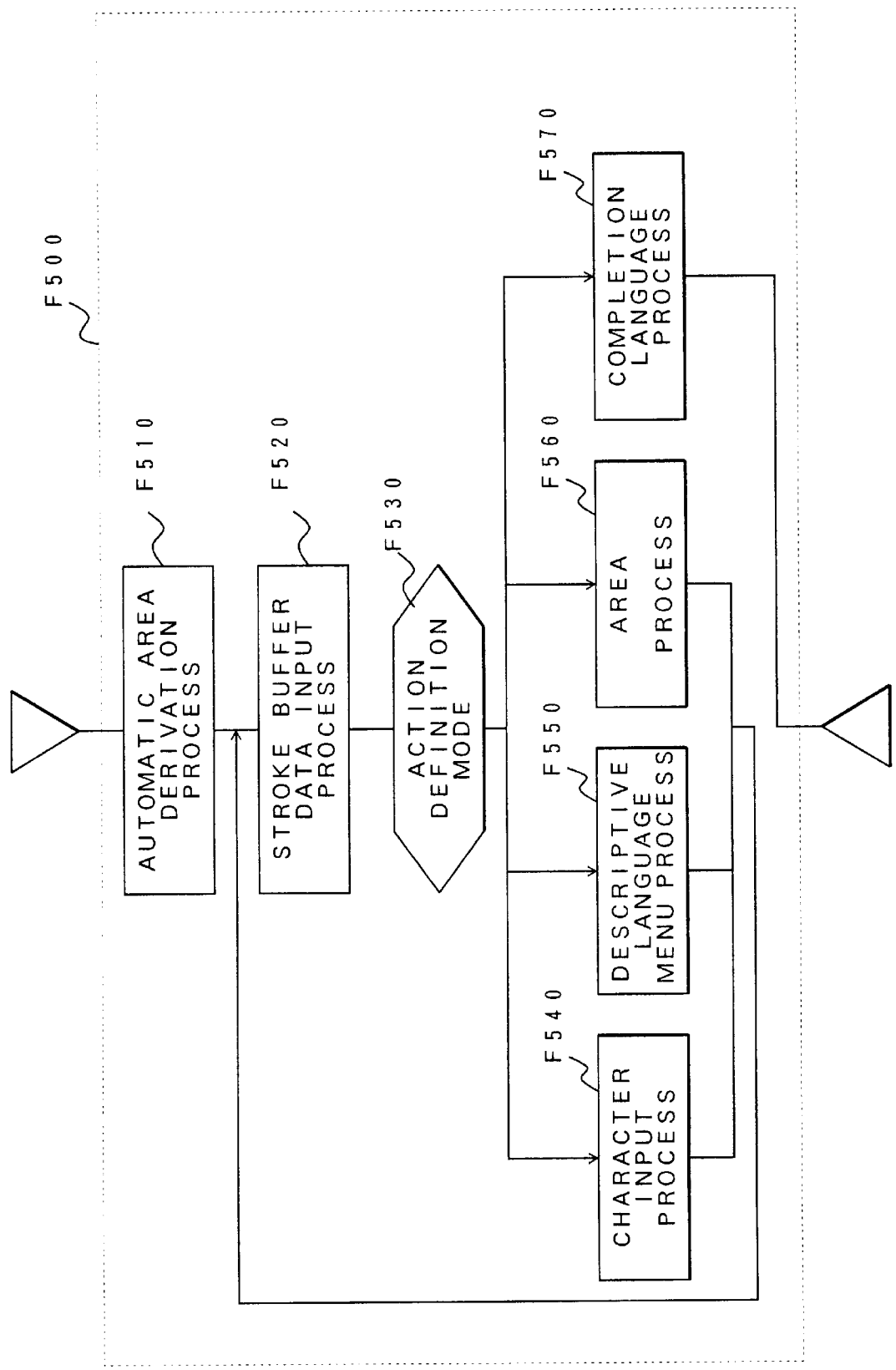

FIG. 16 is the detailed flow chart of the operation definition process (step F500).

First, in accordance with the screen data T100 defined at the screen definition process. (F400), an automatic area deriving process is executed (step F510).

Areas of a formatted document written on a paper are divided by border lines which are mainly straight lines. However, all areas are not necessarily divided according to this criterion. Examples of such a case and the area partitioning method will be explained next with reference to FIG. 17.

Figures 17, 17A, 17B:
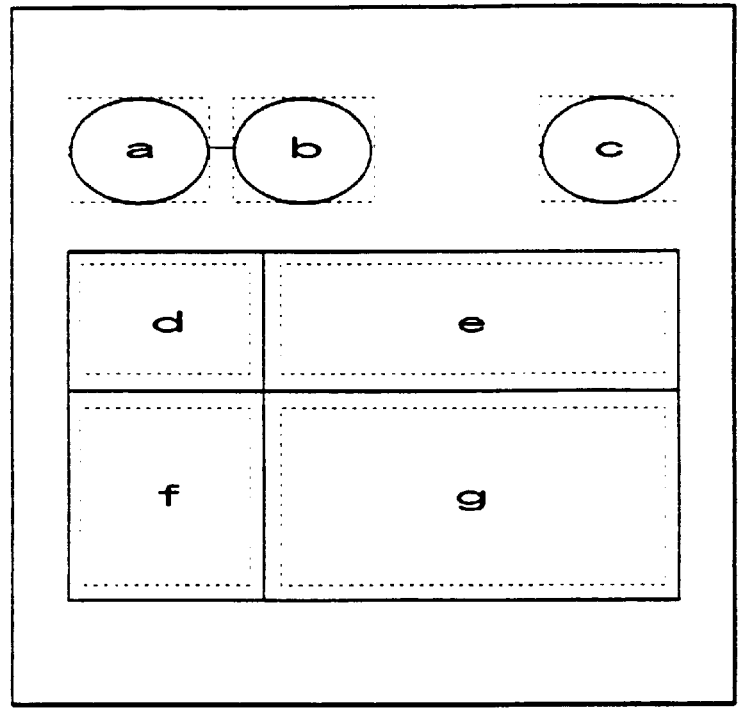

An example shown in FIG. 17(a) includes areas a to g, and an example shown in FIG. 17(b) includes areas h to s. Solid lines are those lines written on the document formats, and broken lines define derived areas. The area partitioning method will be described below.

(i) A Method of searching a closed area

Areas a to c shown in FIG. 17(a) are closed areas of an ellipsoid frequently used for a destination name area. The closed areas are defined by a rectangular frame surrounding the ellipsoid. Areas d to g in FIG. 17(a) are also closed areas.

By searching closed areas, the areas of the format can be partitioned. As the method of searching a closed area, there are a method of searching a closed area by scanning line data stored in the display memory shown in FIG. 9 one line after another, and a method of searching a closed area by sequentially tracing lines to find a smallest loop which is then separated as one closed area.

(ii) A Method of searching a U-character shaped rectangular area

Each area k, n, g, m, p, and s shown in FIG. 17(b) is called a U-character-shaped rectangular area having one side of the rectangle being removed.

Such a form is often used for a table.

As a method of searching such an area, there is a method whereby a line is traced from an arbitrary point, and when an end point comes, the line is traced back in the opposite direction. When another end point comes, in accordance with the obtained data (e.g., quantum codes in the four directions), a U-character shaped rectangular area is separated.

(iii) A method of searching a blank character

The objects to be searched are blank character areas h, i, and j for year, month and day in FIG. 17(b).

This blank character area can be separated by storing mapping coordinates of a character string when defining a character screen, and by searching the mapping coordinates and a blank code in the character string.

Instead of the automatic area deriving methods described above, other methods may be used.

Returning back to the flow chart shown in FIG. 16, after the automatic area deriving process, a stroke buffer data input process is executed (step F520) to discriminate (step F530) between the operation definition modes at the submenu MENU 3 shown in FIG. 12(b). In accordance with the discriminated operation definition mode, a proper process is activated (steps F540 and F570).

The area process (F560) executes deletion or change of areas derived at step F510, addition of a new area, and a grouping process for a plurality of areas. The grouping process is a process for combining, e.g., two areas n and g shown in FIG. 17(b) into a single area.

If a set area is highlighted as necessary, e.g., by painting it out, coloring it, or displaying it with a dotted line, the described definition can be easily recognized.

When the "completion" menu is discriminated at step F530, a UI/HAND-TALK language process (step F570) is executed to generate the UI/HAND-TANK definition data T200. This data is an intermediate code and interpreted and executed by the interpreter shown in FIG. 11.

The detailed flow chart of the definition process has been described above. Next, the working process (step F600) shown in FIG. 14 will be described below with reference to FIGS. 18 to 36.

Figure 18:
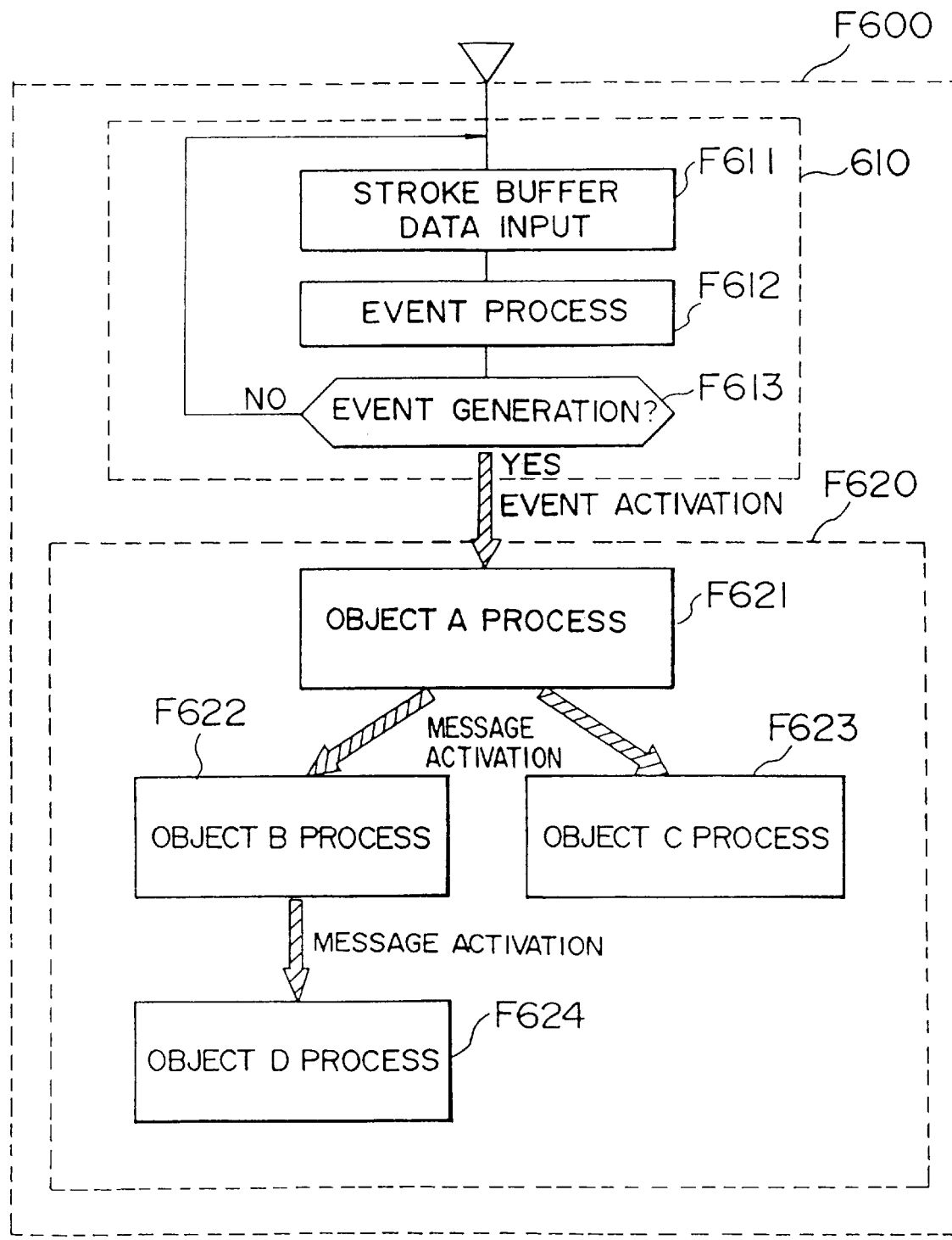

FIG. 18 is a flow chart illustrating the operating process when actually using the already defined formatted document. This process is executed by using the above-described object-oriented programming scheme. The fundamental concept of this scheme will first be described, and then the contents of each operation description will be explained.

Referring to FIG. 18, step F610 relates to an event process constituted by a stroke buffer input process (step F611), an event process (step F612), and an event occurrence judgment process (step F613).

As an event in this event process, there are five types of events such as shown in FIG. 34. Namely, (i) stroke-on ( ): an event representative of the fact that a handwritten stroke has changed from an off state to an on state, (ii) stroke-on ( ): an event representative of the fact that a handwritten stroke has changed from an on state to an off state, (iii) stroke timeout ( ): an event representative of the fact that a predetermined time has lapsed after a handwritten stroke changed to an off state, (iv) pen-button-off ( ): an event representative of the fact that a button on a pen tip has changed from an off state to an on state, and (v) pen-button-on ( ): an event representative of the fact that a button on a pen tip has changed from an on state to an off state.

There are other events such as an event representative of that the coordinates of a stroke-on have moved from its own area to another area, or conversely an event representative of that the coordinates have entered-in its own area, these events being omitted from the associated figures.

Since only one pen is used, the physical device shown in FIG. 34 has only one type. However, by introducing the concept of a logical device, a physical device may be arranged to be extended to a plurality of logical devices.

In FIG. 35, a physical device is extended to two logical devices for an input device and for an edit device.

With this arrangement, it becomes possible, for example, for a single pen to be used as a multipurpose pen, i.e., as an input pen at one time and as an edit pen at another time. This pen may be extended to a pen allowed to be used only by an authorized person.

Such extension requires a function to give a correspondence between physical and logical devices (this correspondence will be described later). FIG. 34 shows a correspondence of five physical devices and input logical devices. It is obvious that only the pen buttons may be assigned as edit pen buttons.

In the events shown in FIG. 34, a parameter of an event is described within the parentheses. If no parameter is described, a default is used.

There are the following parameters for an event.

(a) Parameters for stroke-off and stroke-on

As a parameter for this event, a feature number of coordinates when an event occurs is described. A feature number includes a start point, end point, gravity center point, and middle point, respectively of a stroke. For example, if the gravity center is selected, it is suitable for the input of a check mark. As the default, the stroke-on takes the start point, whereas the stroke-off takes the end point.

(b) Parameters for stroke timeout

A time at the timeout is described. The default is 2 seconds.

(c) Parameters for the pen-button-on and pen-button-off

The type number of a pen button is described. This button is usually mounted at the pen tip and corresponds to a mouse button. The number of buttons is one (left) or two (right and left). The default is (left).

Returning back to FIG. 18, at the event process (step F610), when an occurrence of an event described with FIG. 34 is detected, the coordinates at the time of the occurrence of the event are checked (the coordinates at the previous time for the stroke timeout and pen button) to activate an object at the area corresponding to the coordinates.

The activated object checks the type of the event, and if there is any description in the object, the process is executed according to the description. If there is no description, the process is passed to an object at the lower area containing and superposing upon the activated object, i.e., in the example shown in FIG. 5, the sheet object G110.

In FIG. 18, it is assumed that an object A (object A ( )) has been activated. The object A executes the event process defined for its own, and wishes to request another object to execute some process. This request is conducted through message activation of the object-oriented programming. A message activation has the following format. SEND object name message name (parameter)

The object name is the destination name, and the message name is a message name assigned to the destination object.

For example, if an object A requests other objects B and C to execute some process, and the object C requests another object D to execute some process, then the following message activations are issued send B message 1 ( )

send C message 2 ( )

send D message 3 ( )

wherein messages 1 to 3 represent the message names.

As described so far, according to the object-oriented programming, objects are sequentially processed by means of event activation and message activation.

After all object processes have been completed, the control returns to the event process at step F610.

The fundamental concept of the operation process has been given above. Next, particular process operations will be described with reference to FIGS. 19 to 36.

In the following description, an example of an operation description and its process contents regarding the formatted mail document shown in FIG. 5 will be explained. In FIG. 19 and the following figures, numbers at the right end are line numbers given for the convenience of description.

FIG. 19 shows examples of an operation description of the menu object G220, wherein FIG. 19(*a*) illustrates an input menu object and FIG. 19(*b*) illustrates an edit menu object. With these operation descriptions, there is selected either an input mode for inputting objects such as inputting characters and graphics respectively made of a handwritten stroke, or an edit mode for editing such objects.

In a statement

Object input-menu (menu)

{

}

"Object" is a reserved word representative of an object, "input-menu" represents the name of an object, and "(menu)" represents a prototype of the object, namely, it means that the function and data structure of the object menu are inherited. It is advantageous in that if this inheritance function is used, a module structure having a new object or the like can be realized by generating a fundamental object and by adding a function thereto, "{" at the first line and "}" at the eighth line indicate the start and end of the object.

In the operation description of this "input menu" object, a correspondence between physical and logical devices described with FIG. 34 is defined, and the menu now concern is highlighted. Specifically, when an event of an edit stroke off ( ) occurs (this event occurs because a physical device has been assigned to the edit stroke), assignment of the devices Nos. 1 and 2 shown in FIG. 34 is changed (lines 3 and 4 in FIG. 19(*a*)). Assignment change of devices is executed by using an event_map function.

Next, the input stroke is erased and the menu highlight process is executed to thereafter terminate this object process (lines 5 and 6).

The operation description for the "edit menu" object shown in FIG. 19(*b*) is similar to the "input menu" object, so the explanation thereof is omitted.

FIG. 20 illustrates an operation description for a "sheet" object G110 shown in FIG. 5. The proto-type of this object is a window.

With this object, the operation description is used only for providing a blank sheet so that it describes to erase a handwritten stroke if inputted.

Specifically, when an event of an input or edit stroke occurs, the entered stroke is erased to thereafter terminate the process. Therefore, once a handwritten stroke is displayed, it is erased when the stroke-off event occurs, thereby neglecting any input to this area.

FIG. 21 shows an example of an operation description of a receiver area object G130 shown in FIG. 5.

With the operation description in this area, a handwritten stroke is first recognized as a character, and a document is transferred to a mail destination represented by this recognized character code.

Statements at lines 1 to 3 in FIG. 21 describe a definition of the type of a handwritten stroke. The concept and objective of this handwritten stroke type will be described below.

FIG. 36 shows the kinds of handwritten stroke types which are broadly grouped into the following five kinds.

(i) Character stroke type (CHA_ST)

a stroke recognized as a character. (ii) Graphics stroke type (GRAPH_ST)

a stroke recognized as a graphics.

(iii) Line stroke type (LINE_ST)

a stroke type recognized as a line other than graphics.

(iv) Image stroke type (IMAGE_ST)

a stroke recognized as an image.

(v) Edit stroke type (PROOF_ST)

a stroke recognized as an edit or proof symbol.

Each stroke type is further classified into subtypes. The character stroke type in particular has as many as ten subtypes.

As described above, handwritten strokes are used for various purposes. The kinds of strokes, however, are limited in many cases, depending upon an area of a formatted document. For example, at the areas h, i, and j in the formatted document shown in FIG. 17(*b*), only numerals are permitted. On the other hand, at the receiver area G130 shown in FIG. 5, only kanji of 1st standards, kanji of 2nd standards, hiragana, and katakana are permitted to use.

By defining the limitation of stroke types permitted to enter in each area, it is possible to improve the performance of recognition and to inform a user of an alarm when a limited stroke is entered.

Figure 3:
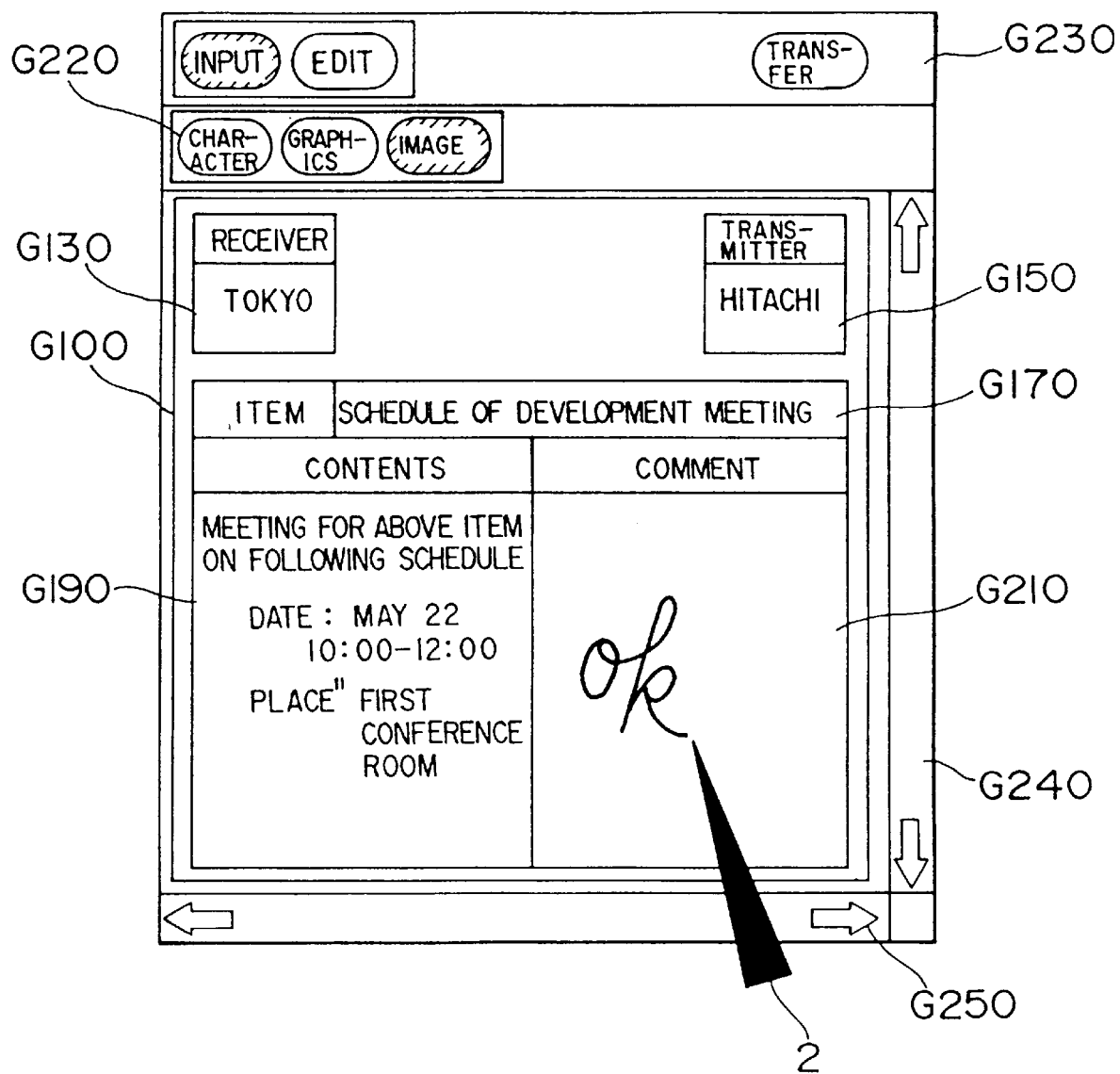
FIG. 3 is a diagram explaining the operation of making a formatted mail document using a computer by a conventional method.
Figure 4:
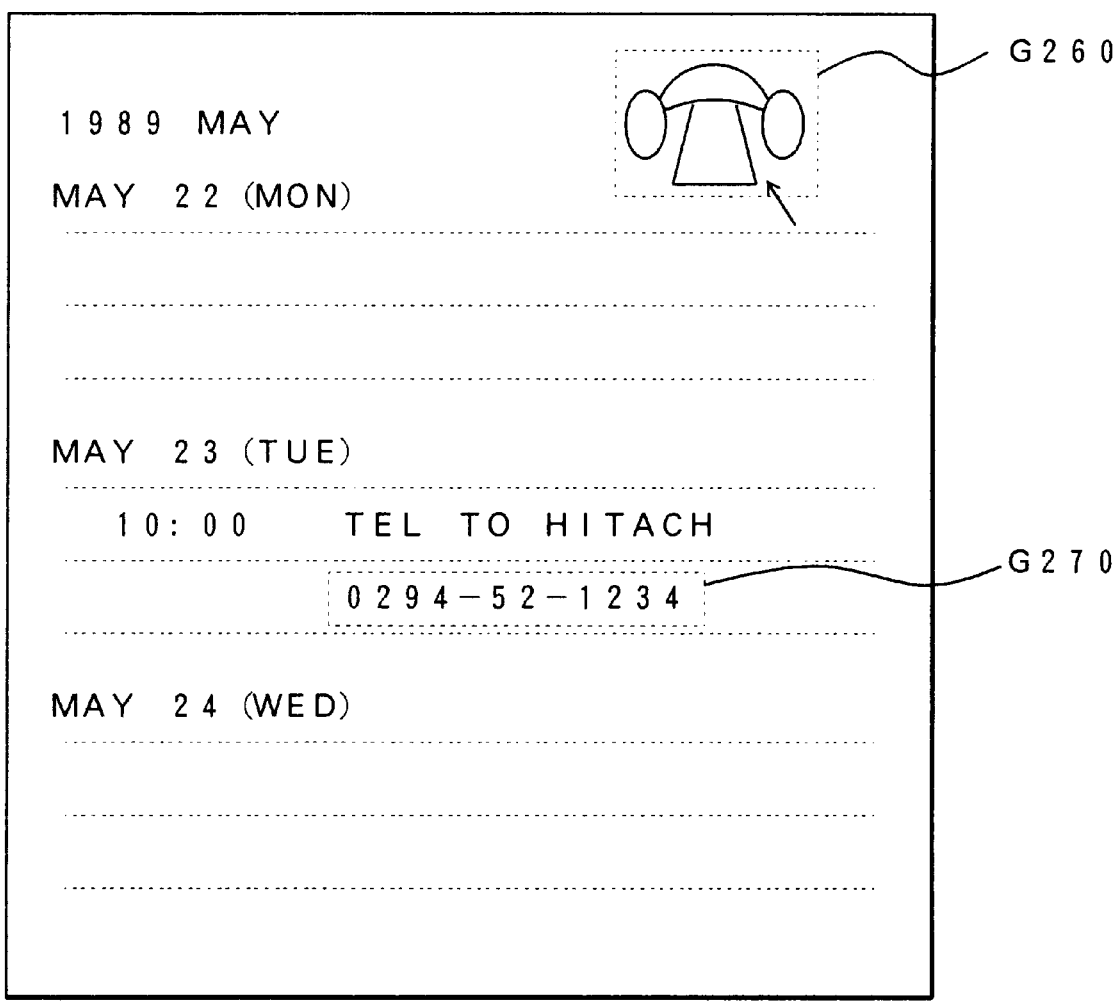
FIG. 4 illustrates a conventional HyperCard configuration.

Since a stroke type can be defined in advance, it is not necessary to provide a menu for designating the kind of a stroke as in the conventional case shown in FIG. 3, thereby contributing to having a smaller number of modes and considerably improving the operability of this embodiment.

Furthermore, by extending the stroke type so as to enable to designate the recognition range as in the following, this embodiment may be applied to various fields. For example, given a definition sttypedef ALPHA_L {H, I, T, A, C}: HITACHI
attributes=pass_name: HITACHI, then the static parameter pass_name interprets that the stroke type is for HITACHI and that this type is an upper case alphabet ALPHA_L type and only the character codes for H, I, T, A, and C are permitted. Therefore, if an area is defined with a HITACHI stroke type, only particular characters can be recognized so that this stroke type can be used like a pass word.

Figure 32:
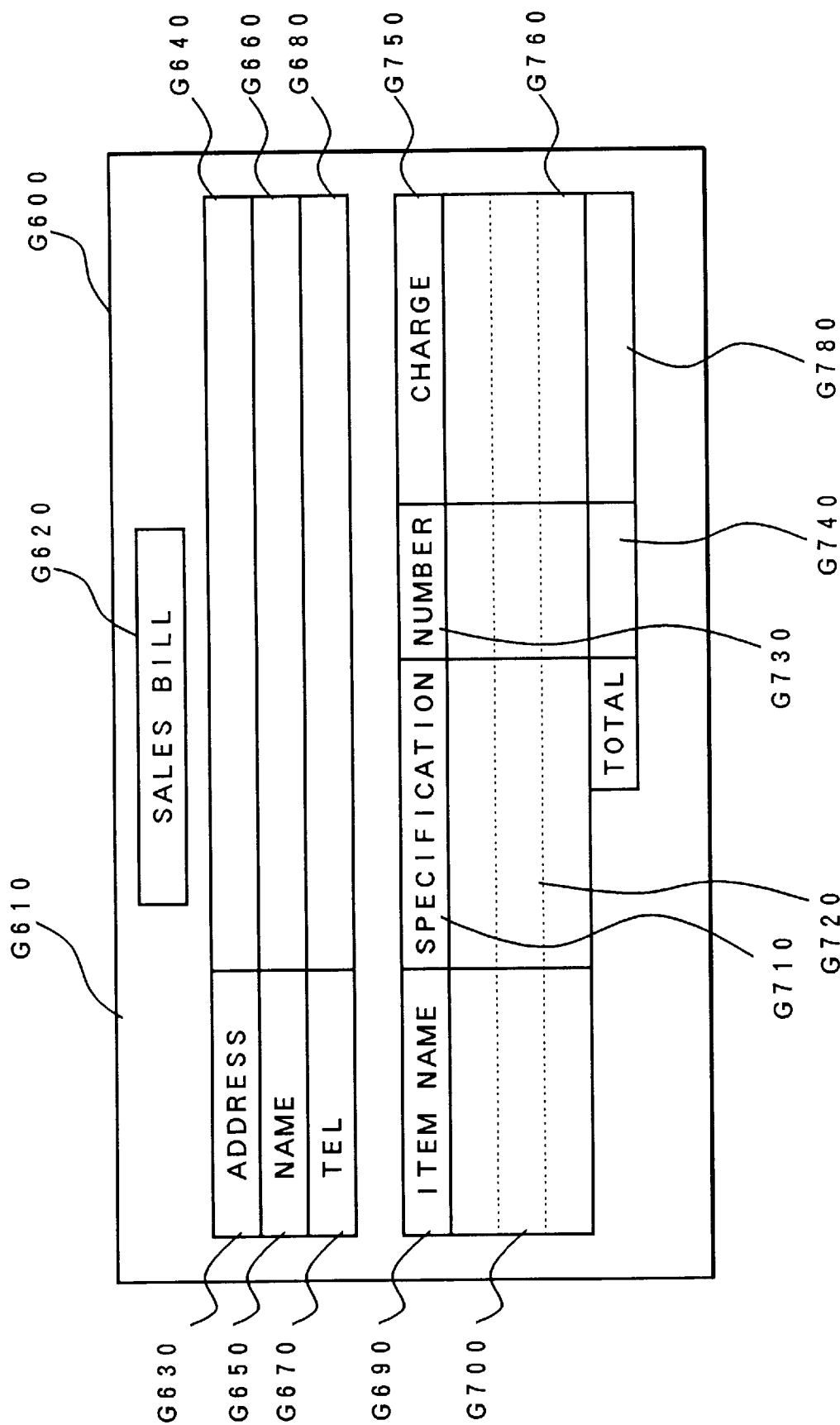

Such a definition scheme for a stroke type and its recognition range designation is suitable for use in inputting data in a sales bill shown in FIG. 32. For example, a specification area G720 often uses characters specific to the entered item name. If particular codes for that item name are declared in advance, it is possible to give an alarm display to a user when a character other than the declared characters is entered, thereby preventing possible erroneous character input.

An example shown in FIG. 21 declares a parameter name_result as a NAME stroke type, and a parameter proof_result as a PROOF stroke type.

In FIG. 21, "!" represents a logical sum, "attributes" represents a static parameter (parameters are stored in a resident memory), and "variables" represents a dynamic parameter (parameters are stored in a stack).

In FIG. 21, the following three events are described.
(i) event input stroke-on ( )
(ii) event input stroke timeout ( )
(iii) event edit stroke timeout ( )

When the event (i) occurs, there is first executed the ninth line send stroke_cut_out frame (cut_out_OK)

to cut out the stroke as a character. This line means that a message "frame" of the "stroke_cut_out" object is processed and the results are reflected on a flag of "cut-out OK".

Next, there is executed the tenth line
if cut_out OK
{send recognition recognition execution (name_result)}

This description means that if the character cut_out flag (cut_out_OK) is true, a message "recognition execution" of the "recognition" object shown in FIG. 22 is executed and the results are stored in the name_result.

If the character cut_out flag (cut_out_OK) is false, there is executed the eleventh line while stroke-off { } to loop until the handwriting stroke changes from an on state to an off state.

Next, when the event (ii) of an input stroke timeout occurs, a message "recognition execution" of the "recognition" object is transferred (at lien 14). Then, there is transferred a message indicating that the code representative of the recognition results is registered as the receiver name (at line 15). Lastly, in order to transmit the mail document, a message "mail" of the "transfer" object is transferred to thereafter terminate the process (at line 16).

The event (iii) is used for the description of correcting a receiver name using edit symbols.

The operation description for the "receiver" object has been described above. Other objects will be briefly described below.

FIG. 22 shows the operation description for a "recognition" object, including six messages.

This object does not correspond to an area, but it is activated by a message from another object.

The first message description at lines 3 to 11 message recognition execution (result:SSTYPE) { } is a program for this object. "STTYPE" at line 3 is a dummy stroke type.

If the types of real and virtual arguments of a usual programming language such as PASCAL do not coincident with each other, they are recognized as a syntax error. Different from this concept, with the present dedicated handwriting descriptive language, the stroke type is considered rather as an attribute data belonging to a parameter. Specifically, the above-described "STTYPE" means that it is a dummy stroke type having no attribute and that the attribute of a real argument is inherited during execution. For example, since the name_result stroke type is defined in advance as "NAME" at line 4 in FIG. 21, if the descriptions at lines 10 and 14 in FIG. 21 send recognition recognition execution (name_result) are executed, "STTYPE" becomes the same stroke type as "NAME" because of type inheritance during execution.

On the other hand, if the description at line 19 in FIG. 21 send recognition recognition execution (proof_result)

is executed, "STTYPE" inherits "PROOF".

In this manner, as the message at line 4 in FIG. 22 send stroke type kind (result)

is transferred, the stroke type can be discriminated during execution.

After the stroke type has been discriminated, as indicated at lines 5 to 10, a message to be recognized in accordance with each stroke type is transmitted to thereafter complete the process "recognition execution".

The operation description for each recognition process is given at line 12 and the following lines in FIG. 22.

Consider now send edit kind (kind)

in the message "edit symbol recognition execution" at line 34. In this process, there is searched a code under the coordinate position (proof_result) (determined by the coordinates) at which an edit symbol was entered, and in accordance with the coordinate position, the kind of a subject to be edited is determined.

For example, if there is a character code under the coordinate (proof_result), it means a character edit, and if there is a graphics code, a graphics edit is executed. This is executed at line 35 send edit execution (kind, proof_result).

As another method of discriminating a subject to be edited, there is a method of defining an edit parameter for each area, and discriminating a subject in accordance with the value and attribute of a parameter.

FIG. 23 illustrates a description of a "display" object activated by the object shown in FIG. 22. Consider in particular the following description at line 4 of this object.

send range check results are (cha_result, ok)

Figure 24:
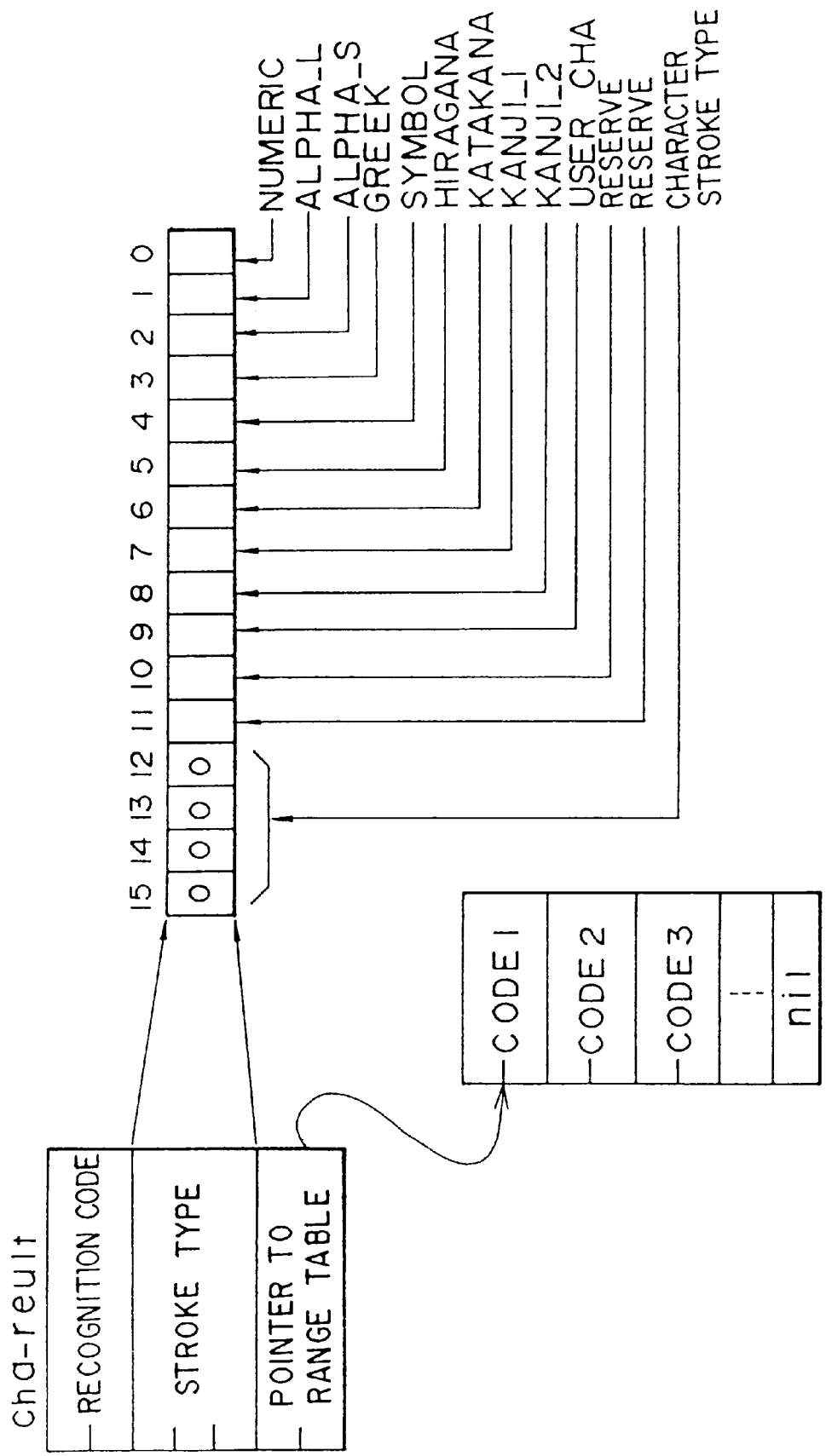

This description means that it is checked if the recognized code is a character code falling within the range defined by sttypedef, and the results are reflected in an "ok" flag. The data structure of cha_result is constructed, as shown in FIG. 24, of a recognition code (2 bytes), stroke type attribute (3 bytes), and range table pointer (2 bytes). The data structure of each of other stroke types is the same as above.

The character range defined by the operation description is stored in the range table, so that the range can be checked from the code and the recognition code.

If the range check results are false at line in FIG. 23, an "alarm display" is executed to give a user some alarm message.

FIG. 25 shows a description of a "transmitter" object at the area G150 shown in FIG. 5.

In this object, there is provided a description that a handwritten stroke is recognized as a character, and its code is registered as a handwriting transmitter.

This description is the same as that for the "receiver" object in FIG. 21 except that there is no descripion for the mail transfer at line 16 and the description at line 15 in FIG. 25 is changed from "receiver registration" to "transmitter registration".

FIG. 26 shows a description of an "item" object at the area G170 of FIG. 5.

This object is used for entering a title of the item, and provides a description of recognizing a handwritten stroke as a character and displaying it or editing a character. The description contents can be easily inferred from the explanation given to the "receiver" object, so the explanation of the contents is omitted.

FIG. 27 shows a description of a "contents" object at the area G190 of FIG. 5.

This object provides a description for entering the particular contents of an item, the description including the character recognition and edit similar to the "item" object. In this "contents" object, however, the stroke type of the static parameter c_result is declared so as to allow an input of almost all types of characters shown in FIG. 36 (lines 1 to 5 in FIG. 27).

FIG. 28 shows a description of the "comment" object at the area G210 in FIG. 5.

In this area, as described previously, a handwritten stroke is not recognized as a code, but is used directly as an image. Therefore, in this object, the static parameter image_result is declared as a DOT stroke type so as to form a handwritten stroke as an image (line 1). This declaration is reflected to the description at line 5 to actually allow an input of a handwritten comment. A description for an image edit is also provided (lines 8 to 10).

FIG. 29 shows a description of the "vertical scroll" object at the area G240 in FIG. 5. This "vertical scroll" object designates a prototype of "screen operation" to use this function for an actual scroll process. Specifically, upon input of a scroll in this area, an up- or scroll process is executed until the scroll is made off.

The "screen operation" object is shown in FIG. 30. The description at line 4 get_scroll_co (x, y)
is a function to check the current scroll position coordinates (x, y), and the description at line 5
 scroll_exec (x, y, o, delta_y)
is a function to execute an actual scroll.

The delta_Y can be obtained from a function at line 4 in FIG. 29
 get_delta_co (delta_x, delta_y).

The "vertical scroll" object is defined to receive an event both in the input and edit modes.

FIG. 31 shows an example of another description of the "receiver" object at the area G130 in FIG. 5. This description example is for dynamically changing the attribute of a particular area when a mail document is transferred to the receiver.

Consider in particular the description at line 6
 attributes=c_result:DOT.

The c_result is a static parameter, and the attribute change of the succeeding object process is preferentially executed. Therefore, it is preferentially executed over the description at line 5 in FIG. 27
 attributes =c_result:ALL_CHA,
so that when the receiver actually receives a mail, the attribute at the "contents" area at G190 in FIG. 5 is changed to the image (DOT) stroke type.

For example, if a person in charge enters a handwritten stroke, a clear character thereof is entered in a document. However, if this document is transferred to a supervisor of the person, the handwritten stroke is not transformed into a clear character but the original stroke is supplied, allowing to freely provide a handwritten memo. Such a case is often met at the practical business organization.

The embodiment of this invention has been described above. The following is the advantageous effects of this embodiment.

The first effect is as follows. The handwriting input unit made of an integral structure of the handwriting coordinate input device and a plane display (LCD) is provided with a form defining unit for defining in advance the operation description for a handwritten stroke on the area unit basis, and a stroke interpretation executing unit for interpreting and executing the operation description defined for an area for which a handwritten stroke was entered. Therefore, the meaning of an entered handwritten stroke can be automatically interpreted by the apparatus, thereby providing a realistic sense of writing data on a paper with a pen, without intercepting human thinking processes and with a greatly improved man-machine interface capability.

The second effect is as follows, it is possible to provide a description of a handwriting recognition function to recognize a handwritten stroke for each area and convert it into a code. Therefore, a system function of a network using mails, telephones, FAXes, electronic conferences, can be realized by means of handwritten strokes. As compared with a conven tional point-to-point designation, office transactions can be easily simulated, and the embodiment handwritten input information system can support the roll of a secretary.

The third effect is as follows. The form defining unit and the stroke interpretation executing unit can define the kind and recognition range of a handwritten stroke. Therefore, it becomes possible to improve the performance of recognition factor and prevent erroneous input. It is particularly suitable therefore for an input of a formatted bill document.

The fourth effect is as follows. The processing apparatus automatically derives an area for the operation definition at the stage after the screen of a form has been defined. Therefore, a user is not required to set areas for the form, thereby improving the efficiency of form definition.

The fifth effect is as follows. There is provided a mechanism capable of readily changing the process operation contents for a handwritten stroke at an area by changing only an attribute at the area concerned or at another area. Therefore, the flexibility and operability of form definition can be improved.

The sixth effect is as follows. The input system of the handwriting input unit is interfaced via a stroke buffer with a function system of the stroke interpretation executing unit, separating the input system from the function system. Therefore, handwritten strokes can be sequentially entered without influence of the operation speed of the function system, alleviating a nervous temper of a user due to a delay of response.

The seventh effect is as follows. This process sing apparatus is portable in nature because it is interfaced with a network via radio waves and contains a battery. Therefore, it can be used freely at offices, during business trips, or at homes.

The eighth effect is as follows. The logic circuits of the processing apparatus are. mounted on the glass of the handwriting input unit. Therefore, it can be thinned like a note or sheet.

The ninth effect is as follows. The logic circuits of the processing apparatus are mounted at the periphery of the handwriting input unit. Therefore, it can be placed on an OHP to use it for presentations.

Another embodiment of this invention will be described with reference to FIGS. 37 to 42.

Figure 37:
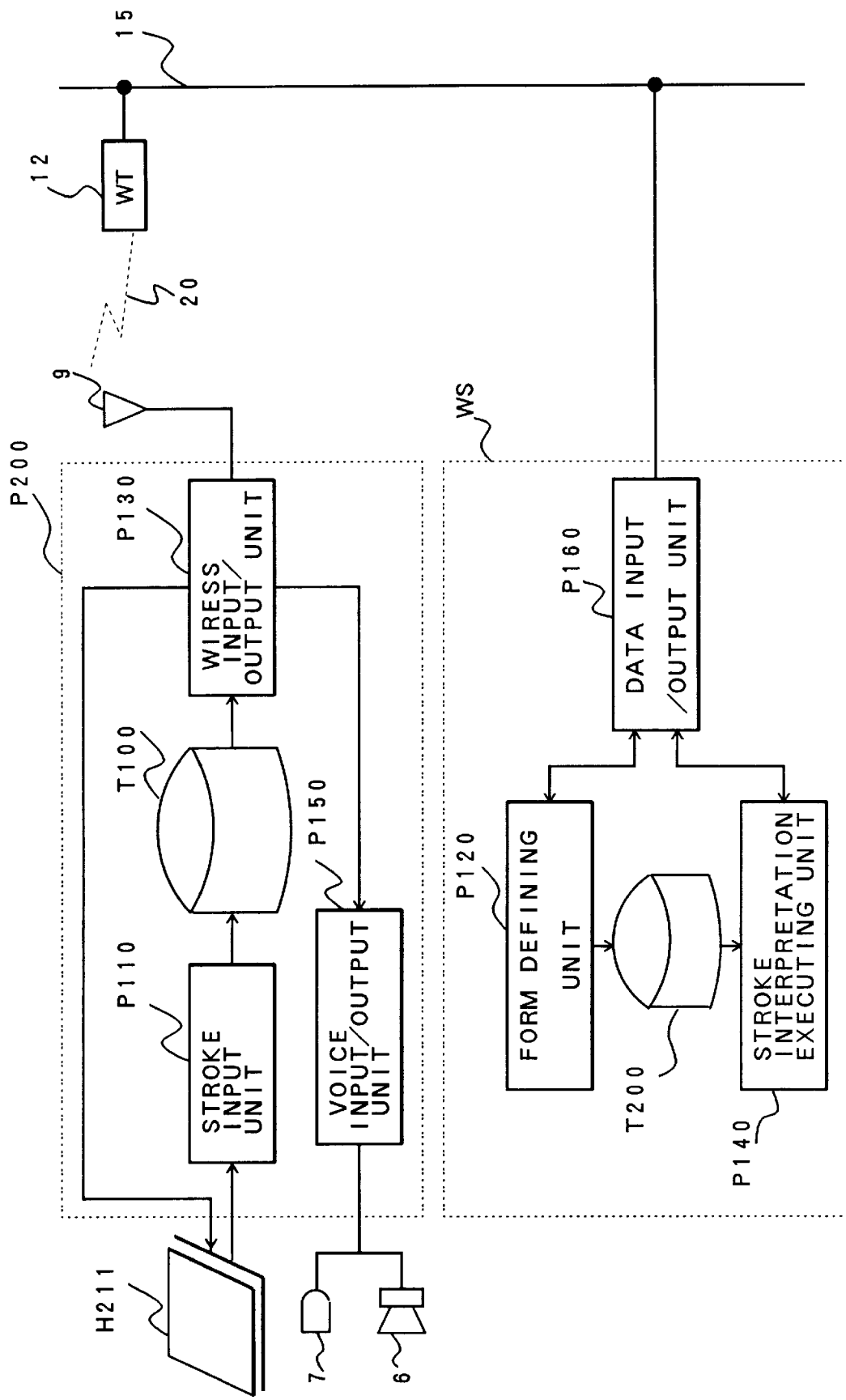
FIGS. 37 to 38 show system arrangements of another embodiment of. this invention wherein processing units including the handwriting input unit, form defining unit, and stroke interpretation executing unit are distributed over a network.
Figure 38:
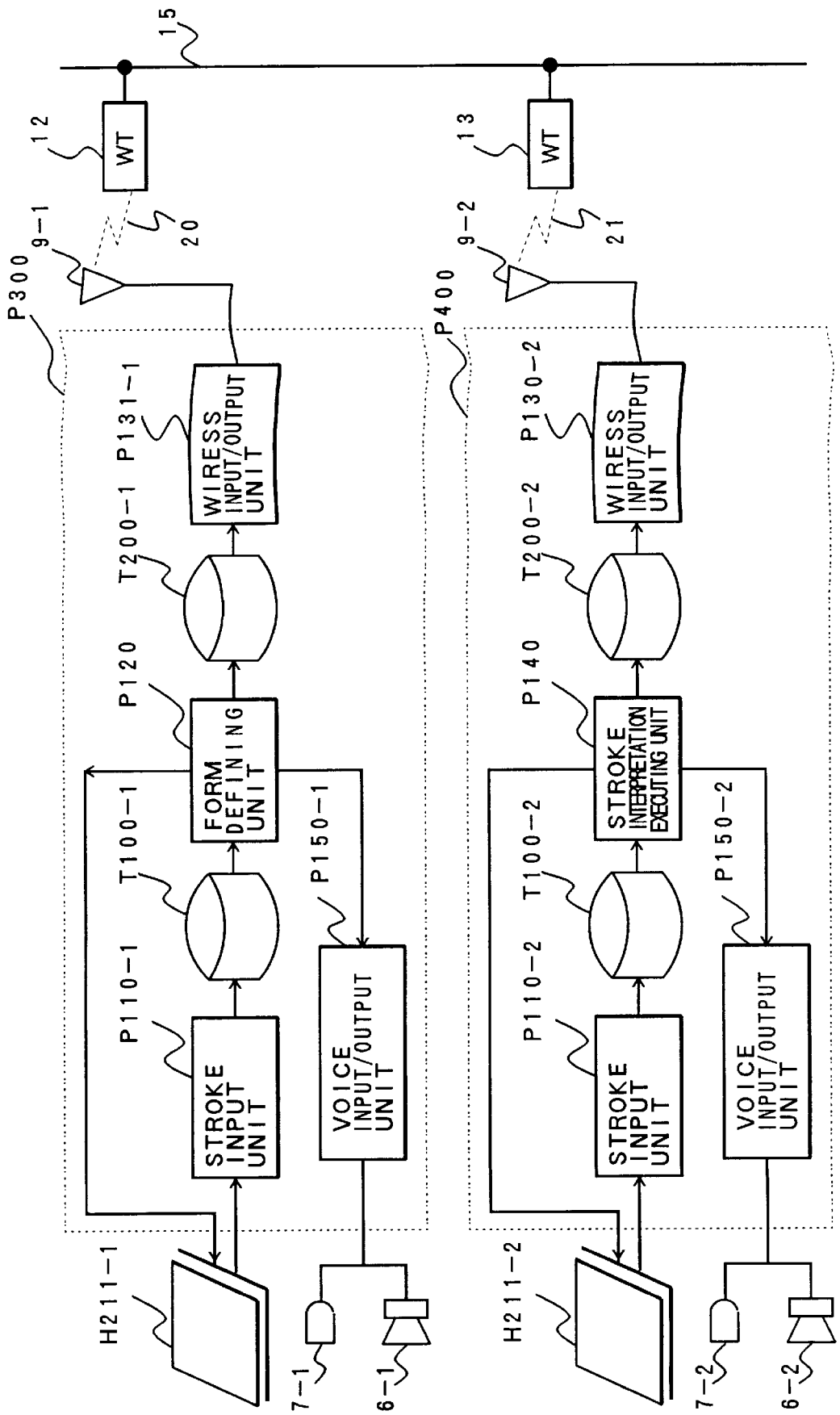

FIGS. 37 and 38 show system arrangements wherein the processing units of the system including a handwriting input unit, form defining unit, and stroke interpretation executing unit are distributed over a network.

FIG. 37 shows a system arrangement wherein two processing units including a form defining unit P120 and a stroke interpretation executing unit P140 are connected to a workstation WS on a network to execute distributed processing, and only a processing unit of a handwriting input unit P110 is connected to the processing apparatus.

With this system arrangement, the handwritten input information processing apparatus can be advan tageously made compact and inexpensive since it has only the handwriting input unit and a man-machine interface unit for voices and the like.

FIG. 38 shows a distributed system arrangement wherein processing units including a handwriting input unit P110-1 and a form defining unit P120 are connected to a handwritten input information processing unit P300, and processing units including a handwriting input unit P110-2 and an interpretation executing unit P140 are connected to another handwritten input information processing unit P400. According to the concept of this arrangement, a unit for defining a form and a unit for operating the defined from is separated, and they are operated by exchanging UI/HAND-TALK definition data. This definition data may be exchanged not via the network but by means of a memory card.

With this arrangement, the definition data of formatted documents can be managed at one place, thereby providing a simple management of documents. Furthermore, at the stage when managing the defined document, it is not necessary to provide an editor for use in defining handwritten forms, thereby reducing the system scale and making the apparatus inexpensive.

Figure 39:
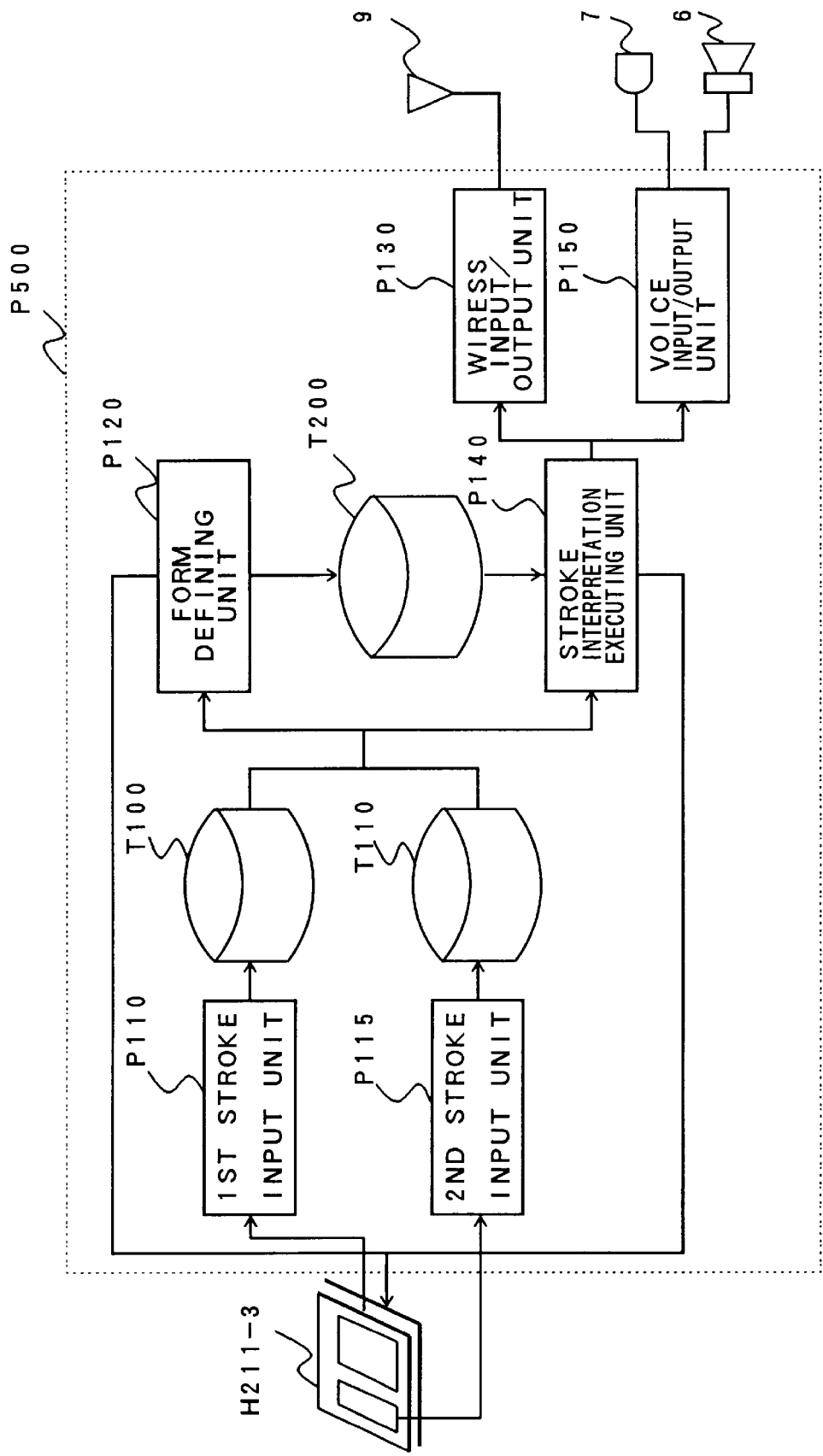
FIG. 39 shows a system arrangement of another embodiment of this invention wherein a plurality of stroke input units are provided.

FIG. 39 shows a system arrangement wherein a plurality of stroke input units are provided.

Figure 40:
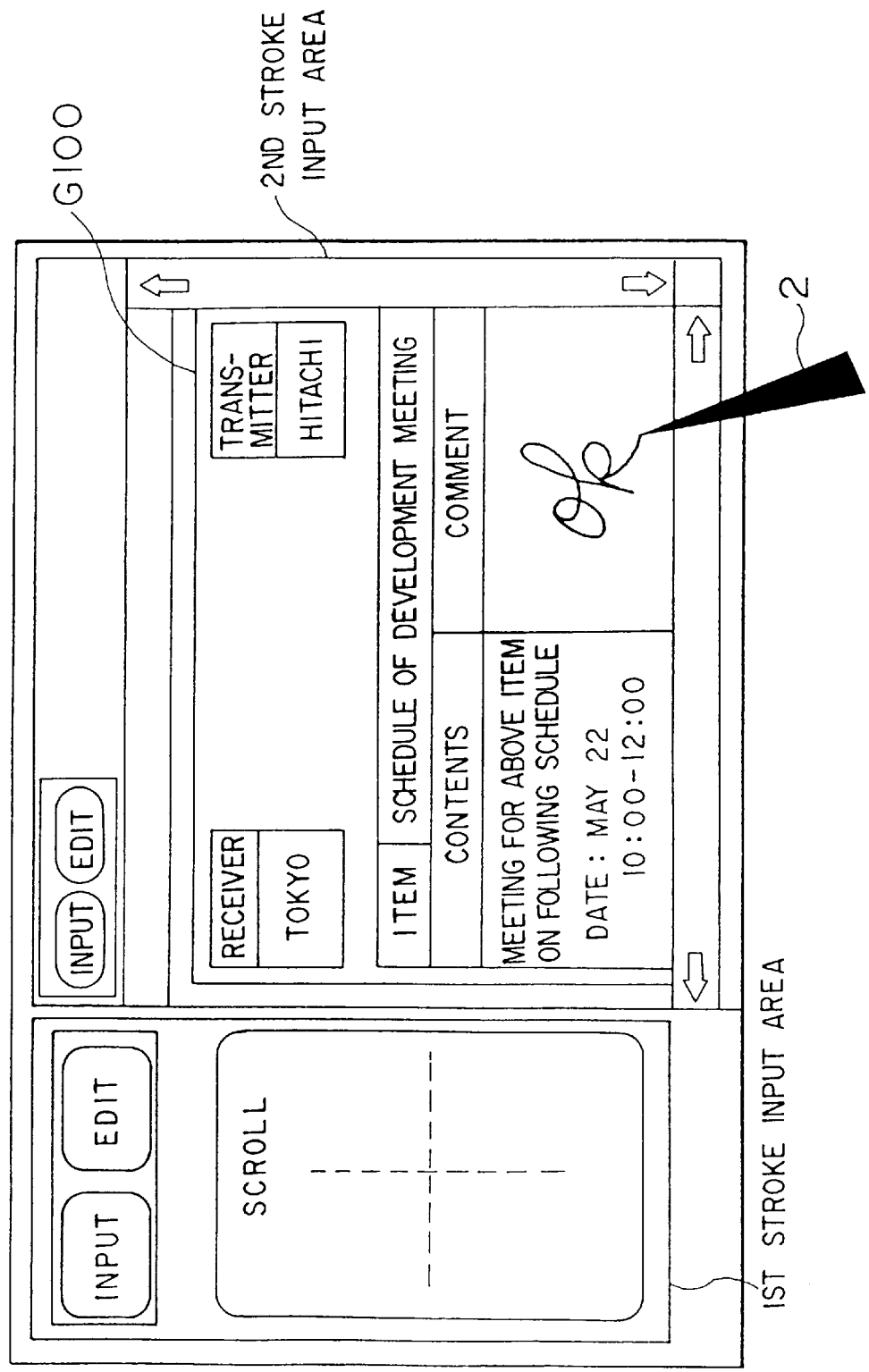
FIG. 40 is a diagram used for explaining the stroke input unit shown in FIG. 39.

Specifically, the handwriting input unit is provided with first and second stroke input units P110 and P115. As shown in FIG. 40, the first stroke input unit is used for an input of a stroke with one hand in the first embodiment of this invention, whereas the second stroke input unit is used for an input of a screen operation stroke with the other hand or a foot.

In general, a right-handed person having a pen with the right hand has a free left hand. Therefore, if the left hand is used for scroll operation or other basic menu operations, a more proper man-machine interface can be realized. For example, as shown in FIG. 40, if the left hand is pulled lower right on the second stroke input area, the screen G100 can be scrolled lower right.

FIG. 41 shows an example of an operation description of a "scroll" object for the second stroke input area, and FIG. 42 is an event map for this input area. In the operation description shown in FIG. 41, when an event of a screen operation stroke-on occurs, two-dimensional scroll continues to be executed until the screen operation stroke turns off. The description at line 5 send screen operation two-dimensional scroll (delta_x, (delta_y)

is the message described in the "screen operation" object shown in FIG. 30. In FIGS. 39 and 40, the second stroke input area is arranged so as not to overlap with the first stroke input area. These areas may also be so arranged to overlap with each other. In such a case, the screen is caused to scroll right and left or up and down, with a hand moving along corresponding positions, thereby providing a more realistic sense of pulling a paper with a hand.

According to the embodiment shown in FIGS. 39 to 41, both hands can be used for operating the handwritten input information apparatus, thereby considerably improving the man-machine performance.

In FIG. 5 showing an embodiment of this invention, a change between an input mode and an edit mode has been designated with a menu. As other methods of changing a mode, there are a method of changing a mode by means of a pen button, and a method of changing a mode in accordance with a stroke length which is characteristic information of a handwritten stroke.

The method using a stroke length will be described below. The operation description for this is as in the following.

if stroke length <= threshold value

{send stroke cut-out frame (cut-out ok)

if cut-out ok {send recognition recognition execution ( )} even_map (' input stroke-on, 'input stroke-off, 'input stroke timeout)

} else

{ event_map (' edit stroke-on, 'edit stroke-off,

'edit stroke timeout)

}

By describing the above contents as the input stroke-on event of the "contents" object shown in FIG. 27, it is possible to dispense with a menu for switching between the input and edit modes, thereby further reducing the number of modes and improving the operability.

In the embodiment of this invention, P120 and P140 shown in FIG. 1 have been assumed as an interpreter. This may be constructed of a compiler same as in the case of an ordinary programming language. However, a program is required to be compiled every time an operation description is changed.

Furthermore, in the embodiment of this invention, a physical device for a handwritten stroke has been extended to two input and edit logical devices. If a color display is used, colors may be changed with the kind of a logical device, further improving the operability. For example, if black is assigned to an input mode, and a read is assigned to an edit mode, a more realistic image of real paper and pen can be realized.

Use of a color display can discriminate between areas to be recognized and not recognized, in accordance with colors, thereby making easier for a user to enter data.

In the embodiment of this invention, the handwriting coordinate input device and the plane display has been formed in an integrated structure. They may be formed. separately. In this case, there is an inconvenience that both a hand and screen surface are to be observed repeatedly.

Further, the battery in the embodiment of this invention shown in FIG. 9 may be replaced with a solar battery.

Furthermore, the coordinate input and display glass in the embodiment of this invention shown in FIG. 7 may be made of plastics material. In this case, a more realistic image of paper can be attained like a sheet computer or a paper computer, with further paper-less office environment.

What is claimed is:

1. A handwritten input information processing apparatus, including a handwriting input unit made of an integral structure of a handwriting coordinate input device and a plane display, said display having a screen having a plurality of input areas receiving handwritten input information, comprising:

a form defining unit adapted to define in advance a process operation for handwritten input information of each input area of said screen of said handwriting input unit, said screen having at least two input areas with respectively corresponding independent and different process operations, wherein the different independent process operations respectively correspond to the at least two input areas of the screen, wherein handwritten information inputted in one of said input areas is operated by a process operation corresponding to said one of said input areas, and a process operation executing unit adapted to read said process operation that corresponds to an area into which handwritten information was inputted and to execute said read process operation, wherein said form defining unit and said process operation executing unit, respectively, include an operation description for causing a particular input area to change the process operation contents of a handwritten stroke in said particular input area, and an execution process for said operation description, whereby changing said process operation of said processing operation unit can be performed without affecting the process operations of the other input areas.

2. A handwritten input information processing apparatus according to claim 1, wherein said form defining unit and said process operation executing unit, respectively, describe a handwriting recognition process operation for recognizing a handwritten stroke in said handwriting input unit as a predetermined code, and execute said described process operation.

3. A handwritten input information processing apparatus according to claim 1, wherein said form defining unit and said process operation executing unit derive a feature data of a handwritten stroke in said handwriting input unit, and use said feature data as the information for said process operation description.

4. A handwritten input information processing apparatus according to claim 1, wherein said form defining unit comprises a screen defining unit that defines a layout of said screen and an action defining unit describing a process operation for a handwritten stroke for each input area defined by said screen defining unit.

5. A handwritten input information processing apparatus according to claim 4, wherein an object area for the operation description by said action defining unit is derived in accordance with a screen definition data defined by said screen defining unit.

6. A handwritten input information processing apparatus according to claim 5, wherein said input area is derived as one of a closed area, a U-character-shaped rectangular area with one side of a closed rectangle being removed, and a blank character area in a character string, in accordance with line information of said screen definition data.

7. A handwritten input information processing apparatus, including a handwriting input unit made of an integral structure of a handwriting coordinate input device and a plane display, said display having a screen having a plurality of input areas receiving handwritten input information, comprising:

a form defining unit adapted to define in advance a process operation for handwritten input information of each input area of said screen of said handwriting input unit, said screen having at least two input areas with respectively corresponding independent and different process operations, wherein the different independent process operations respectively are described in the at least two input areas of the screen, wherein handwritten information inputted in one of said input areas is operated by a process operation corresponding to said one of said input areas, and a process operation executing unit adapted to read said process operation that corresponds to an area into which handwritten information was inputted and to execute said process operation, wherein said form defining unit and said process operation executing unit, respectively include an operation description for causing a particular input area to change the process operation contents of a handwritten stroke in said particular input area and an execution process for said operation description, whereby changing said process operation of said processing operation unit can be performed without affecting the process operations of the other input areas.

8. The handwritten input information processing apparatus according to claim 7, wherein said form defining unit and said process operation executing unit, respectively, describe a handwriting recognition process operation for recognizing a handwritten stroke in said handwriting input unit as a predetermined code, and execute said described process operation.

* * * * *

UNITED STATES PATENT AND TRADEMARK OFFICE
CERTIFICATE OF CORRECTION

PATENT NO. : 5,903,667
DATED : May 11, 1999
INVENTOR(S) : S. Kuzunuki, et. al.

Page 1 of 2

It is certified that error appears in the above-identified patent and that said Letters Patent is hereby corrected as shown below:

| Column | Line | |
|---|---|---|
| 1 | 40 | Delete "recent". |
| 1 | 49 | After "incapable" delete ";". |
| 2 | 20 | Change "this" to --thus--. |
| 4 | 36 | Delete "this". |
| 7 | 26 | Change "for.the" to --for the--. |
| 8 | 65 | After "definition" insert --,--. |
| 9 | 52 | Change "larea" to --area--. |
| 10 | 16 | After "area." do not start new paragraph. |
| 11 | 31 | Change "g," to --q,--. |
| 11 | 33 | After "removed." do not start new paragraph. |

UNITED STATES PATENT AND TRADEMARK OFFICE
CERTIFICATE OF CORRECTION

PATENT NO. : 5,903,667
DATED : May 11, 1999
INVENTOR(S) : S. Kuzunuki, et. al.

It is certified that error appears in the above-identified patent and that said Letters Patent is hereby corrected as shown below:

| Column | Line | |
|---|---|---|
| 11 | 61 | Change "n and g" to --n and q--. |
| 12 | 39 | Change "entered-in" to --entered in--. |
| 12 | 46 | After "devices" insert --,--. |
| 13 | 27 | After "format." start new paragraph. |
| 14 | 21 | Change "proto-type" to --prototype--. |
| 14 | 44 | After "character." start new paragraph. |
| 16 | 60 | Before "send" indent to start new paragraph. |
| 19 | 25 | Change "advan tageously" to --advantageously--. |

Signed and Sealed this

Twenty-seventh Day of June, 2000

*Attest:*

Q. TODD DICKINSON

*Attesting Officer*   *Director of Patents and Trademarks*